United States Patent
Heo et al.

(10) Patent No.: US 9,351,257 B2
(45) Date of Patent: May 24, 2016

(54) LOW ENERGY SHORT RANGE COMMUNICATION FUNCTION OPERATION METHOD AND APPARATUS OF MOBILE TERMINAL

(71) Applicant: Samsung Electronics Co., Ltd, Gyeonggi-do (KR)

(72) Inventors: Changryong Heo, Gyeonggi-do (KR); Kenhyung Park, Gyeonggi-do (KR); Hyunseok Shin, Gyeonggi-do (KR); Hyunsoo Kim, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 7 days.

(21) Appl. No.: 14/042,329

(22) Filed: Sep. 30, 2013

(65) Prior Publication Data

US 2014/0094198 A1   Apr. 3, 2014

(30) Foreign Application Priority Data

Sep. 28, 2012   (KR) .................. 10-2012-0109406

(51) Int. Cl.
*H04B 1/16*   (2006.01)
*H04W 52/02*   (2009.01)

(52) U.S. Cl.
CPC ........ *H04W 52/0274* (2013.01); *H04W 52/028* (2013.01); *Y02B 60/50* (2013.01)

(58) Field of Classification Search
CPC .......... H04W 52/0274; H04W 52/028; H04W 52/0209; H04W 52/0229; H04W 52/0251; H04W 52/0261; Y02B 60/50
USPC ............ 370/311, 310; 455/334, 343.1–343.5, 455/574
See application file for complete search history.

(56) References Cited

U.S. PATENT DOCUMENTS 7,844,805 B2   11/2010   Chang
8,041,940 B1 *  10/2011   Natanzon ............ H04L 63/0485
                                                              370/389

(Continued)

FOREIGN PATENT DOCUMENTS

JP       2011-205580       10/2011
KR    10-2006-0090707       8/2006
WO    WO 2012/067774        5/2012

OTHER PUBLICATIONS

International Search Report dated Dec. 19, 2013 in connection with International Patent Application No. PCT/KR2013/008769, 4 pages.

(Continued)

*Primary Examiner* — Ronald Eisner

(57) ABSTRACT

The mobile terminal supporting low energy short range communication function includes a low energy short range communication unit; a switching unit configured to receive low energy communication data from the low energy short range communication unit and outputs the low energy communication data; a first processor configured to receive the low energy communication data received from the low energy short range communication unit via the switching unit; and a second processor configured to receive the low energy communication data received from the low energy short range communication unit via the switching unit, wherein the second processor is configured to receive operation state information from the first processor; and control, when the operation state information is received, the switching unit to relay the low energy communication data to one of the first and second processors based on the operation state information.

20 Claims, 10 Drawing Sheets

(56) References Cited

U.S. PATENT DOCUMENTS

| | | |
|---|---|---|
| 2006/0129861 A1 | 6/2006 | Kee et al. |
| 2006/0133604 A1* | 6/2006 | Buer et al. ................. 380/28 |
| 2008/0016374 A1 | 1/2008 | Gee et al. |
| 2008/0244227 A1* | 10/2008 | Gee et al. ................... 712/30 |
| 2009/0063839 A1* | 3/2009 | Bhogal et al. ................ 713/2 |
| 2010/0064154 A1 | 3/2010 | King |
| 2010/0313050 A1 | 12/2010 | Harrat et al. |
| 2011/0124375 A1 | 5/2011 | Stuivenwold |
| 2011/0170464 A1* | 7/2011 | Sengottaiyan .... H04W 52/0229 370/311 |
| 2011/0179295 A1* | 7/2011 | Jahagirdar et al. ............ 713/320 |
| 2011/0235535 A1 | 9/2011 | Furukawa |
| 2012/0188928 A1 | 7/2012 | Wang et al. |
| 2013/0232538 A1* | 9/2013 | Johnson ....................... 725/151 |
| 2014/0059365 A1* | 2/2014 | Heo ....................... G06F 1/3206 713/320 |
| 2014/0075226 A1* | 3/2014 | Heo ....................... G06F 1/3234 713/323 |
| 2015/0228048 A1* | 8/2015 | Heo ....................... G06F 1/3293 345/502 |

OTHER PUBLICATIONS

Partial European Search Report issued for EP 13186735.0 dated Apr. 12, 2016, 10 pgs.

* cited by examiner

LOW ENERGY SHORT RANGE COMMUNICATION FUNCTION OPERATION METHOD AND APPARATUS OF MOBILE TERMINAL

CROSS-REFERENCE TO RELATED APPLICATION(S) AND CLAIM OF PRIORITY

The present application is related to and claims the benefit under 35 U.S.C. §119(a) of a Korean patent application filed on Sep. 28, 2012 in the Korean Intellectual Property Office and assigned Serial No. 10-2012-0109406, the entire disclosure of which is hereby incorporated by reference.

TECHNICAL FIELD

The present disclosure relates to a low energy short range communication function operation method and apparatus of a mobile terminal and, in particular, to a method and apparatus for operating the short range communication function of the mobile terminal configured for low energy communication function in sleep mode using a low energy processor.

BACKGROUND

Recently, there is much interest in Bluetooth (BT) technology as one of the short range wireless communication standard for fulfilling low cost and low energy bidirectional short range communication. Bluetooth communication technology is a short range wireless connection technology capable of bidirectional data communication through pairing of the electronic device within a short range. The Bluetooth communication technology is ratified as one of the short range wireless communication standard, various techniques are being developed and widespread in various fields due to the low energy characteristic.

Recent interests in Bluetooth communication technology are focused on fast transmission of small amount of data and low energy communication technique allowing for communication with low power consumption, breaking from the conventional large-amount data transmission issue. Such a low energy Bluetooth communication technology is applied in various fields such as health care and medical service as well as communication between devices such as monitoring sensor, mobile computer, mobile phone, headset, PDA, tablet PC, and printer.

In the case of the mobile terminal, the communication module responsible for Bluetooth communication is controlled by a process such as Application Processor (AP). The AP of the mobile terminal is also responsible for controlling function blocks and calculation for processing data.

Meanwhile, the mobile terminal in idle state enters sleep mode to reduce power energy consumption. In the sleep mode, the AP cuts off the power supply to various function blocks and the communication interface. Accordingly, the mobile terminal in the sleep mode cannot use the function blocks connected to the AP.

Particularly when monitoring and collecting data using Bluetooth communication, although the Bluetooth communication data are received successfully, the mobile terminal in the sleep mode cannot process the data immediately. For example, although it receives the data from a health care appliance (e.g., heart beat rate meter and blood pressure meter) requiring continuous measurement at a short period, the conventional mobile terminal can experience data processing delay in the state where the processor utilization amount exceeds a predetermined level.

Also, the AP has to stay in active mode requiring the state where the mobile terminal is powered on in order to perform the function of receiving data periodically from outside such as GPS, Bluetooth, and Wi-Fi functions. In this case, the periodic signal scanning causes significant power consumption so as to reduce the battery span.

There is, therefore, a need of a method for monitoring the data from the Bluetooth devices and sensor module and operating the Bluetooth communication function regardless of the operation at low power level regardless of the operation state of the AP.

SUMMARY

To address the above-discussed deficiencies of the prior art, it is a primary object to provide a Bluetooth communication method and apparatus that is configured to monitor and process low energy Bluetooth communication data or low energy short range communication data continuously regardless of the operation state, e.g., active mode and sleep mode, of the terminal has the short range communication function.

Also, it is another object of the present disclosure to provide a Bluetooth communication method and apparatus that is configured to provide various location-based services with low energy consumption in such a way of measuring and compensating terminal location based on the sensor data and low energy Bluetooth data in the terminal operating in sleep mode.

A short range communication data processing device according to the present disclosure includes a short range communication unit; a switching unit configured to receive short range communication data from the low energy short range communication unit and output the short range communication data; a first processor configured to process the short range communication data received from the short range communication unit via the switching unit; and a second processor configured to process the short range communication data received from the short range communication unit via the switching unit, wherein the second processor is configured to receive operation state information from the first processor and control, when the operation state information is received, the switching unit to relay the low energy communication data to one of the first and second processors based on the operation state information.

A short range communication data processing method of a mobile terminal according to the present disclosure includes receiving, at a second processor, operation state information of a first processor from the first processor; controlling, at the second processor, a switching unit to relay short range communication data to one of the first and second processors based on the operation state information; and processing, at the second processor when the short range communication data is received via the switching unit, the short range communication data.

A short range communication data processing method of a mobile terminal according to the present disclosure includes sending, at the first processor, an operation state information to a second processor and a short range communication unit in response to an event of operation state transition; transitioning, when the operation state is a sleep mode, to an active mode according to an interrupt signal from the second processor; receiving, when the operation state is the active state, the short range communication data in the transitioned active mode; determining whether the first processor fulfills a short range communication data processing condition; and processing, when the first processor fulfills the short range communication data processing condition, the short range communication data at the first processor.

Another aspect of the present invention provides a terminal comprising: a communication unit adapted for short range wireless communication (for example a Bluetooth communication unit); first processing means (e.g. a first processor) configured to operate in a first mode (e.g. a sleep mode) and a second mode (e.g. an active mode); and second processing means (e.g. a second processor) configured to process, when the first processing means is in the first mode or a utilization level of a processing capacity of the first processing means is greater than a predetermined threshold, communication data (e.g. low energy communication data) received from one of the communication unit and the first processing means.

It will be appreciated that "short range" in the context of this specification may be up to 1 m, 5 m, 10 m, 50 m, 100 m, 500 m, or 1000 m depending on transmission power levels and receiver sensitivities (for example for embodiments employing Bluetooth communication units), or other relatively short distances compared with long distance telecommunications. Similarly, low energy or low power signals in the context of embodiments of the invention may be signals transmitted at power levels in the range 0.1 to 500 mW, for example power levels up to 0.1 mW, 0.5 mW, 1 mW, 2.5 mW, 5 mW, 10 mW, 50 mW, and 100 mW. For example, current maximum permitted powers and associated typical ranges for class 1, 2, and 3 Bluetooth devices are 100 mW/100 meters, 2.5 mW/10 meters, and 1 mW/1 meter respectively.

In certain embodiments the second processing means is configured to transfer, in response to the first processing means transitioning from the first mode to the second mode, or the utilization of the first processing means becoming equal to or less than the threshold, the communication data (e.g. the lower energy communication data under processing) to the first processing means.

In certain embodiments the terminal further comprises a switching unit configured to: receive the communication data from the communication unit; and relay the communication data to one of the first processing means and the second processing means selectively. Optionally, in certain embodiments, the first processing means is configured to operate in one of the first mode and the second mode and process, in the second mode, the communication data received through the switching unit. Optionally, in certain embodiments, the communication unit is connected to the switching unit and is configured to include a first data port configured to communicate communication data with the first processing means and a second data port configured to communicate the communication data with the second processing means.

In certain embodiments the communication unit is configured to include, when operation information of the first processing means (e.g. information indicative of the current operational mode of the first processing means: sleep, or active) is received from the first processing means, a header information value indicating a data processing host in the communication data based on the operation information.

In certain embodiments the first processing means is configured to: detect a first event comprising a transitioning of the first processing means between the second and first modes and a second event comprising a transitioning of the first processing means between a state where the utilization of the first processing means is greater than the threshold and a state where the utilization of the first processing means is equal to or less than the threshold; and send, when the one of the first and second events is detected, an operation information of the first processing means to the second processing means and the communication unit.

In certain embodiments, the first processing means is configured to hand over, when the first processing means transitions from the second mode to the first mode, a control right on the communication unit to the second processing means.

In certain embodiments the second processing means is configured to one of: receive operation information transmitted by the first processing means; and monitor an operation state of the first processing means to acquire the operation information on the first processing means. Additionally, or optionally, in certain embodiments the second processing means is configured to: analyze, when the communication data is received, a header information value of the communication data to determine a data processing host; forward, when the data processing host is the first processing means, the communication data to the first processing means; and process, when the data processing host is the second processing means, the communication data.

In certain embodiments the terminal further comprises: a sensing unit connected to the second processing means and configured to collect sensor information related to a location of the terminal (e.g. at a low energy level); and a Global Positioning System (GPS) receiver connected to the first processing means and configured to collect GPS location information, wherein the first processing means is configured to: calculate GPS location coordinates based on a satellite GPS signal from the GPS receiver; transfer the calculated GPS location coordinates to the second processing means; and deactivate the GPS receiver until an interrupt signal is generated by the second processing means; and the second processing means is configured to: receive the GPS location coordinates from the first processing means; collect the sensor information related to the location from the sensing unit; and calculate moved (e.g. revised, updated, new) location coordinates of the terminal based on the GPS location coordinates and the sensor information.

In certain embodiments the second processing means is configured to: determine, when the moved location coordinates are in a tolerable error range, whether the communication data is received from the communication unit; and compensate (e.g. adjust), when the communication data is received, the moved location coordinates to be in the tolerable error range based on the communication data.

Another aspect provides a terminal comprising: a communication unit (e.g. a short range wireless communication unit, which in certain embodiments is a Bluetooth communication unit); first processing means (e.g. a first processor) configured to operate in one of a first mode (e.g. a sleep mode) and a second mode (e.g. an active mode); and second processing means (e.g. a second processor) configured to: determine, when the first processing means is in the first mode or a utilization of a processing capacity of the first processing means is greater than a predetermined threshold, a data processing host based on communication data (e.g. low energy communication data) received from the communication unit; transfer, when the data processing host is the first processing means, the communication data to the first processing means; and process, when the data processing host is the second processing means, the communication data.

Another aspect provides a terminal comprising: a short range communication unit (e.g. a low energy short range communication unit, which in certain embodiments is a Bluetooth unit); a switching unit configured to: receive communication data (e.g. low energy communication data) from the communication unit; and output the communication data; first processing means (e.g. a first processor) configured to receive the communication data received from the communication unit via the switching unit; and second processing means (e.g. a second processor) configured to: receive the communication data received from the communication unit via the switching unit; receive operation state information from the first processing means; and control, when the operation state information is received, the switching unit to relay the communication data to one of the first processing means and the second processing means based on the operation state information.

In certain embodiments the communication unit and the second processing means are configured to one of: receive the operation state information transmitted by the first processing means; and monitor an operation state of the first processing means to acquire the operation state information.

In certain embodiments the communication unit is configured to add a header information value indicating a data processing host to the communication data based on the operation state information and send the communication data to the switching unit. Additionally, or alternatively, in certain embodiments the first processing means is configured to: determine, when the communication data is received, whether a utilization of a processing capacity of the first processing means is equal to or less than a predetermined threshold; process, when the utilization of the first processing means is equal to or less than the threshold, the communication data; and transfer, when the utilization of the first processing means is greater than the threshold, the communication data to the second processing means.

In certain embodiments the second processing means is configured to: determine, when the communication data is received, a data processing host by analyzing a header information value of the communication data, transfer, when the data processing host is the first processing means, the communication data to the first processing means, and process, when the data processing host is the second processing means, the communication data.

Another aspect provides a data processing method (e.g. a low energy Bluetooth communication data processing method) of a terminal, the method comprising: receiving, at second processing means (e.g. a second processor), operation state information of first processing means (e.g. a first processor) from the first processing means; controlling, at the second processing means, a switching unit to relay communication data (e.g. short range communication data) to one of the first processing means and the second processing means based on the operation state information; and processing, at the second processing means when the communication data is received via the switching unit, the communication data.

In certain embodiments processing comprises: determining a data processing host for processing the communication data; generating, when the data processing host is the first processing means, an interrupt signal for transitioning operation state of the first processing means; and forwarding, when the operation state of the first processing means is transitioned, the communication data to the first processing means. In certain embodiments the method optionally further comprises: stopping, when the operation state of the first processing means transitions from a first mode (e.g. a sleep mode) to a second mode (e.g. an active mode) or when a utilization of the first processing means changes from a state greater than a predetermined threshold to a state equal to or less than the threshold, processing of the communication data by the second processing means; and transferring the communication data to the first processing means.

Another aspect provides a data processing method (e.g. a low energy Bluetooth communication data processing method) of a terminal, the method comprising: detecting an event comprising an operational state transition of a first processing means (e.g. a first processor); sending, from the first processing means, operation state information (e.g. of the first processing means) to a second processing means (e.g. a second processor) and to a communication unit (e.g. a short range communication unit) in response to the event; determining, at the first processing means, whether a condition (e.g. a predetermined condition, a short range communication data processing condition) is fulfilled; and processing, when the condition is fulfilled, the communication data.

In certain embodiments the condition is fulfilled when a utilization of the first processing means is equal to or less than the threshold.

Certain embodiments further comprise: generating, when the condition is not fulfilled, an interrupt signal to the second processing means; and transferring the communication data to the second processing means.

Another aspect provides a data processing method (e.g. a low energy Bluetooth communication data processing method) of a terminal, the method comprising: receiving, at second processing means (e.g. a second processor), first location coordinates from first processing means (e.g. a first processor) based on Global Positioning System (GPS); receiving, at the second processing means, sensor information related to a location from a sensing unit; calculating, at the second processing means, second location coordinates based on the first location coordinates and the sensor information as the terminal moves; determining, at the second processing means, whether a measurement error of the first location coordinates and the second location coordinates is in a tolerable error range; requesting, when the measurement error is out of the tolerable error range, short range communication (e.g. low energy short range communication within a short distance); compensating, when communication data is received through the short range communication, the second location coordinates using the communication data.

In certain embodiments receiving sensor information comprises acquiring the sensor information from at least one a tri-axial magneto sensor, a tri-axial gyro sensor for sensing change in azimuth and compensating the azimuth, a tri-axial acceleration sensor for sensing movement speed and distance, a barometer sensor for measuring atmospheric pressure altitude, an RGB sensor for sensing color and light, a temperature sensor, an IR sensor for sensing gesture, a proximity sensor, an optical sensor, and a humidity sensor.

In certain embodiments the method further comprises: generating, when the communication data is not received, an interrupt signal requesting the first processing means for location coordinate information acquired through GPS; and compensating the first location coordinates based on GPS location coordinates information received from the first processing means.

In certain embodiments, compensating the second location coordinates comprises: extracting, from the communication data (e.g. low power Bluetooth communication data), third location coordinates of a device (e.g. a Bluetooth device) that transmitted the communication data; and compensating (e.g. adjusting, correcting, updating, revising) the second location coordinates based on the third location coordinates.

Another aspect provides a terminal adapted to implement a method in accordance with any of the above-described aspects and embodiments.

Another aspect of the invention provides a computer program comprising instructions arranged, when executed, to implement a method and/or apparatus in accordance with any one of the above-described aspects. A further aspect provides machine-readable storage storing such a program.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
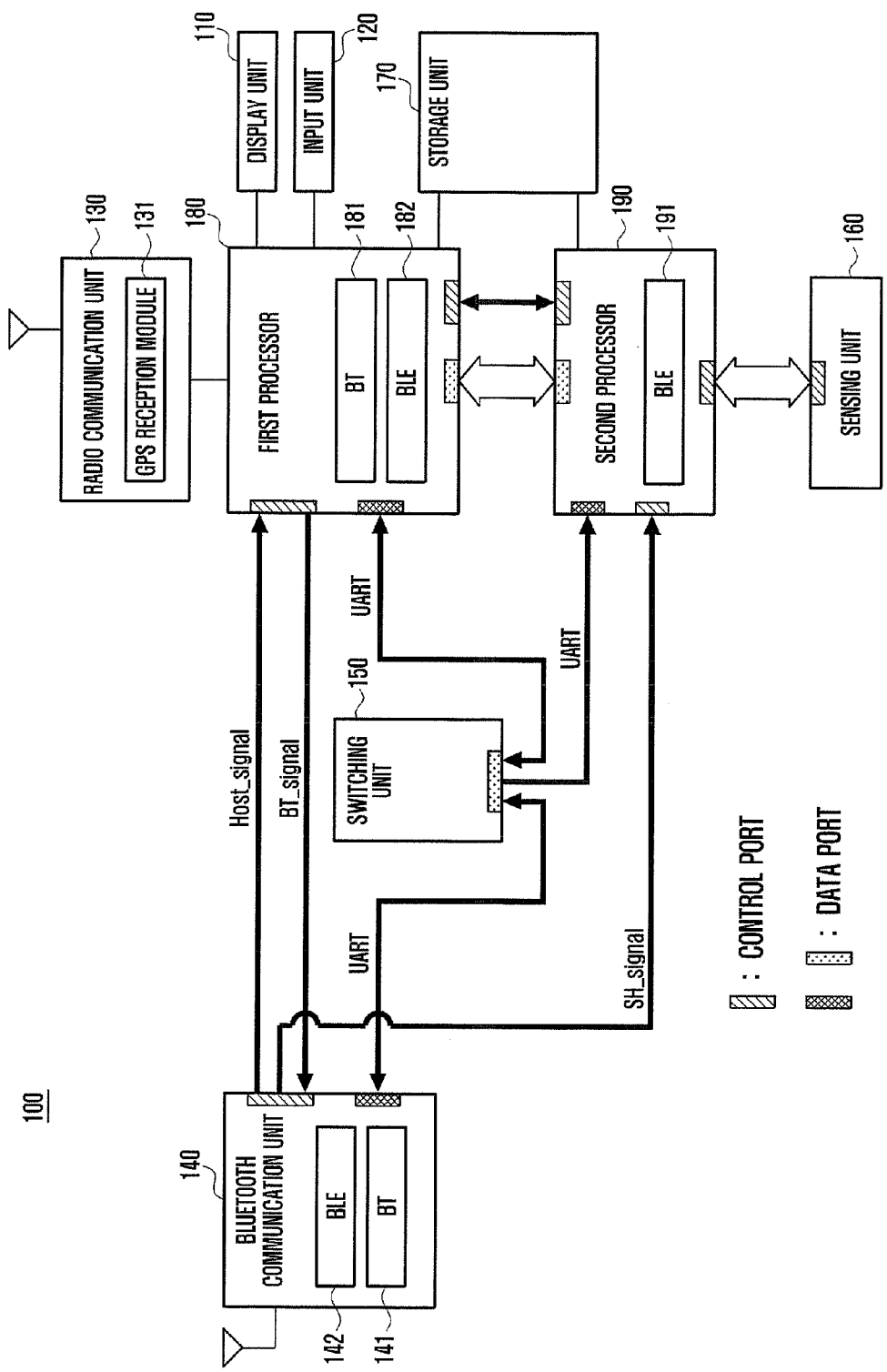
FIG. 1 is a block diagram illustrating the configuration of the mobile terminal according to embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged electronic device. Embodiments of the present disclosure are described with reference to the accompanying drawings in detail. The terms and words used in this description and the appended claims are not to be interpreted in common or lexical meaning but, based on the principle that an inventor can adequately define the meanings of terms to best describe embodiments of the disclosure, to be interpreted in the meaning and concept conforming to the technical concept of the present disclosure. Thus, it should be understood that there can be various equivalents and modified examples that can replace the embodiments described in the present specification and the configuration shown in the drawings at the time of filling the present application. In the drawings, certain elements can be exaggerated or omitted or schematically depicted for clarity of the disclosure, and the actual sizes of the elements are not reflected. Thus, the present disclosure is not limited in the relative sizes of the elements and distances therebetween.

In the present disclosure, the term 'first processor' denotes a main processor for controlling overall operations of the terminal and the signal flows of the internal components. The first processor can be a Central Processing Unit (CPU) or an Application Processor (AP). If it is requested to enter the sleep mode, the first processor activates the second processor and then enters the sleep mode.

In the present disclosure, the term 'second processor' denotes a sub-processor, which is activated when the first processor enters the sleep mode, and operates at low power. The second processor can be any of a low power processor, low power microprocessor (MPU), MCU, sensor nub processor, sensing and sensing processor. The second processor is configured to detect Bluetooth communication signal and sensor signal to process the received data when the first processor enters the sleep mode.

In the present disclosure, the term 'active mode' denotes the active state of the first processor (main processor) such as application processor of the mobile terminal. In the active mode, the first processor is configured to supply power to the function blocks connected to the first processor to perform the functions associated with the first processor. In the case where the first processor operates in the active mode, the second processor operates in a sensor mode in which only the sensor information is collected.

In the present disclosure, the term 'sleep mode' denotes the inactive state of the first processor such as application processor when the mobile terminal is in idle state, i.e., standby state. In the sleep mode, the first processor is configured to cut off the power supply to the function blocks connected to first processor. In the case where the first processor operates in the sleep mode, the second processor operates in the sensor mode or Bluetooth communication mode. Even when the mobile terminal is in idle state, the second processor is configured to collect Bluetooth communication information such as lower energy Bluetooth packet as well as the sensor information.

The first processor in the active mode enters the sleep mode when the user selects a predetermined button (e.g., power key) to generate an input signal. The first processor in the sleep mode enters the active mode when the user selects a predetermined button (e.g., power key) to generate an input signal.

In the present disclosure, the second processor, as well as the first processor, operates in one of the active mode and sleep mode. The active mode of the second processor denotes the active state for collecting sensor information and processing Bluetooth communication data, and the sleep mode of the second processor is the idle state for neither collecting sensor information nor processing Bluetooth communication data.

In the present disclosure, the 'operation signal' denotes the control signal for notifying of data transmission or waking up function blocks before starting Bluetooth communication data transmission. The operation signal can be any of a wakeup signal and interrupt signal.

In the present disclosure, the term 'Bluetooth communication data' denotes the data transmitted/received through a Bluetooth communication channel, and the Bluetooth communication data can be classified into one of BLE packet and BT packet.

In the present disclosure, the term 'Bluetooth Low Energy module (BLE)' denotes a communication technology module characterized by a short duty cycle as compared to the fast Bluetooth technology and significantly reduced power consumption through low data rate. The BLE module type packet can be defined as a data packet transmitted at the data rate of 1 Mbps (BLE packet), but is not limited thereto.

In the present disclosure, the term 'Bluetooth module' denotes a module for supporting fast Bluetooth communication technology and high data rate Bluetooth communication technology. The BT module type packet can be defined as data packet transmitted at the data rate of 4 Mpbs (BT packet), but is not limited thereto.

The mobile terminal, according to an embodiment of the present disclosure, includes all the types of information communication devices equipped with a Bluetooth communication function such as cellular phone, smartphone, tablet PC, hand-held PC, Portable Multimedia Player (PMP), and Personal Digital Assistant (PDA). The mobile terminal according to an embodiment of the present disclosure is also equipped with a multi-tasking function configured to execute several tasks simultaneously. In the following, the description is made under the assumption that the terminal is a mobile terminal.

FIG. 1 is a block diagram illustrating the configuration of the mobile terminal 100 according to embodiments of the present disclosure.

As shown in FIG. 1, the mobile terminal 100 includes a display unit 110, an input unit 120, a radio communication unit 130, a Bluetooth communication unit 140, a switching unit 150, a sensing unit 160, a storage unit 170, a first processor (main processor) 180, and a second processor (subprocessor) 190.

The display unit 110 is configured to display the information input by and presented to the user as well as various menus of the mobile terminal. The display unit 110 is configured to provide various screens in association with the operation of the mobile terminal. The display unit provides a main screen, a message composition screen, a telephony screen, a gaming screen, a music playback screen, and a video playback screen. The display unit 110 can be implemented with a flat display panel such as Liquid Crystal Display (LCD), Organic Light Emitted Diode (OLED), and Active Matrix OLED (AMOLED).

In the case that the display unit 110 is implemented in the form of a touchscreen, it can work as an input device. In the case that the display unit 110 is implemented in the form of the touchscreen, the display unit 110 includes a touch panel to detect a touch gesture. The touch panel is configured to convert the pressure applied to a certain position of the display unit 110 or the variation in capacitance at a certain region of the display unit 110 to an electrical input signal. The touch panel can be implemented in one of add-on type in which the touch panel is situated on the display unit 110 or on-cell type or in-cell type in which the touch panel is inserted into the display unit 110.

The touch panel can be implemented in one of the resistive type, capacitive type, electromagnetic induction type, and pressure type touch panels. The touch panel is configured to detect the pressure of a touch as well as the touched position and area. If a touch gesture is made on the touch panel, the corresponding input signal is generated to the first processor 180. Then the first processor 180 checks the user's touch input information to perform the corresponding function. In certain embodiments, if the first processor 180 is in the sleep mode, the input signal corresponding to the touch gesture is sent to the second processor 190.

The input unit 120 includes a module associated with input to the mobile terminal 100. The input unit 120 receives the user input in association with configuration and control of the functions of the mobile terminal 100 and various character information and generates corresponding input signal to the first processor 180. The input unit 120 is implemented with at least one of touch pad, touchscreen, normal keypad, QWERTY keypad, and special function keys.

The radio communication is responsible for communication function of the mobile terminal. The radio communication unit 130 establishes a communication channel with a supportable mobile communication network for voice telephony, video conference, and data communication. The radio communication unit 130 includes a Radio Frequency (RF) transmitter for up-converting and amplifying the transmission signal and an RF receiver for low noise amplifying and down-converting the received signal. The radio communication unit 130 includes a cellular communication module (e.g., $3^{rd}$ Generation (3G) cellular communication module, 3.5G cellular communication module, and/or 4G cellular communication module) and a digital broadcast module (e.g., DMB module).

The radio communication unit 130 includes a Global Positioning System (GPS) reception module 131. The GPS reception module 131 receives satellite GPS signal from GPS satellites and sends the GPS signal to the first processor. The first processor 180 is configured to calculate the current location of the mobile terminal based on the satellite GPS signals.

The radio communication unit 130 is configured in the form of a set of chips or function modules, a few sets of function modules, or a chip integrating all the function modules, but is not limited thereto.

The Bluetooth communication unit 140 is responsible for short range communication with another Bluetooth communication device. Although the description is directed to the Bluetooth communication unit in this embodiment of the present disclosure, the Bluetooth communication unit 149 can be replaced with other types of short range wireless communication modules such as low energy Wi-Fi module without restriction thereto.

The Bluetooth communication unit 140 broadcasts an inquiry message while hopping the radio frequency channels to discover Bluetooth devices within a transmission distance range and send a device name request to the found Bluetooth devices. The Bluetooth communication unit 140 receives a response message (e.g., inquiry response message or device name response message) transmitted by the Bluetooth devices which have received the request message.

The Bluetooth communication unit 140 connects to the first and second processors 180 and 190. The Bluetooth communication unit 140 connects to the first and second processors 180 and 190 through a control port and to the switching unit through a data port. The control port is the port carrying the operation signal notifying that there is communication data to be transmitted/received on the Bluetooth communication channel. The data port is the port carrying Bluetooth communication data and the connection path of the BLE packet or BT packet. The data port between the Bluetooth communication unit 140 and the switching unit 150 can be a serial port such as DART port, but is not limited thereto. For example, the data port between the Bluetooth communication unit and the switching unit can be a serial port of 4 Mbps data rate, but is not limited thereto. The Bluetooth communication unit 140 includes a control port for delivering the operation signal to the first processor 180.

The Bluetooth communication unit 140 sends the Bluetooth operation signal to the first processor 180 operating in the active mode and sends the Bluetooth communication data to the switching unit 150. At this time, the switching unit 150 sends the Bluetooth communication data to the first processor 180 under the control of the second processor 190.

In contrast, the Bluetooth communication unit 140 sends the Bluetooth operation signal to the second processor when the first processor is in the sleep mode and sends the Bluetooth communication data to the switching unit 150. At this time, the switching unit 150 is configured to transmit the Bluetooth communication data to the second processor 190 under the control of the second processor.

The Bluetooth communication unit 140 includes at least one of the BLE communication module 142, BT communication module 141, and Wi-Fi module (not shown). The BLE communication module 142 transmits/receives BLE packet data, and the BT communication module 141 transmits/receives BT packet data without exception of BLE packet.

If the sleep mode entry information on the first processor 180 is received from the first processor 180, the Bluetooth communication unit 140 can activate only the BLE communication module 142. When the first processor 180 is in the sleep mode, the BLE communication module 142 operates to transmit/receive BLE packet under the control of the second processor 190. When the first processor 180 is in the active mode, both the BLE communication module 142 and the BT communication module 141 operate to transmit/receive BLE packets and/or BT packets under the control of the first processor 180.

For example, when the first processor 180 is in the sleep mode, the BLE communication module 142 sends an operation signal notifying of the receipt of BLE packet to the second processor 190 and a BLE packet to the switching unit 150. Then the switching unit 150 forwards the BLE packet to the second processor 190. As a consequence, the second processor is configured to process the BLE packet even when the first processor 180 is in the sleep mode. In contrast, when the first processor 180 is in the active state, the BLE communication module 142 sends an operation signal notifying the receipt of the BLE packet to the first processor 180 and the BLE packet to the switching unit 150. Then the switching unit 150 forwards the BLE packet to the first processor 180. The first processor 180 is configured to process the BLE packet received from the switching unit 150.

A brief description is made of the BLE packet hereinafter. The BLE packet is formatted as shown in table 1, the unit of data length included in the BLE packet is proposed. Table 1 shows an example of a broadcast BLE packet; the BLE packet format is not limited thereto.

TABLE 1

| Peamble | Access Address | Advertising Header | Payload Length | Advertiser Address | Advertising Data | CRC |
|---|---|---|---|---|---|---|
| 1 | 4 | 2 | 2 | 4 | 0~31 | 3 |

The format of BLE packet includes a preamble, access address information, advertising header information, payload length information, advertiser address information, advertising data information, and CRC information. In the BLE packet, the data length is counted in bytes. The BLE packet has the data length of 16 to 47 bytes, and the broadcast interval can be 20 ms to 10 sec, but is not limited thereto. Certain information can be included in, deleted from, or modified in the BLE packet format.

The Bluetooth communication unit 140 is configured to check the host of the Bluetooth communication data based on the operation state information of the first processor 180 and sends the Bluetooth communication data including the process host information to the switching unit 150.

For example, if the Bluetooth communication data is a BLE packet, the BLE packet processing host can be one of the first and second processors 180 and 190. The BLE packet can be sent to the first processor 180 when the first processor 180 is in the active state and to the second processor 190 when the first processor 180 is in the sleep state.

The Bluetooth communication unit 140 sorts out the header information values for the BLE packet process based on the operation state information of the first processor 180 as shown in table 2. Table 2 shows an example with the header information values that are not limited thereto.

TABLE 2

| Header information value | Packet processing host |
|---|---|
| 0x0 | First processor |
| 0x1 | Second processor |
| 0x2 | Bypass |
| 0x3 | Unknown |

Particularly, if a BLE packet is received in the state that the first processor 180 is in the sleep mode, the Bluetooth communication unit 140 checks the BLE packet processing host and includes the header information corresponding to the processing host in the BLE packet. In detail, if the BLE packet processing host is the first processor 180, the Bluetooth communication unit 140 includes the information corresponding to the value of '0x0' in the BLE packet and, otherwise if the BLE processing packet processing host is the second processor 190, includes the header information corresponding to the value of '0x1' in the BLE packet. The BLE packet processing host changes depending on the type of the received BLE packet. For example, the BLE packet can be a BLE packet for pairing between the terminals or broadcast BLE packet, but is not limited thereto.

When the first processor 180 is in the sleep mode, the Bluetooth communication unit 140 sends the BLE packet including the header information to the switching unit 150, and the switching unit 150 forwards the BLE packet to the second processor 190. If the BLE packet is received, the second processor 190 checks the header information first. If the BLE packet processing host is the first processor 180, the second processor 190 forwards the BLE packet to the first processor 180. For this purpose, the first processor 180 wakes up from the sleep mode to enter the active mode. If the BLE packet processing host is the second processor 190, the second processor 190 processes the received BLE packet.

The switching unit 150 connects to the Bluetooth communication unit 140, the first processor 180, and the second processor 190, and is responsible for relaying the Bluetooth communication data between the Bluetooth communication unit 140 and one of the first and second processors 180 and 190. The switching unit 150 is configured to switch between Bluetooth data ports under the control of the second processor 190. For example, if the first processor 180 is in the active mode, the second processor 190 controls the switching unit 150 to perform switching for data communication between the Bluetooth communication unit 140 and the first processor 180. If the first processor 180 is in the sleep mode, the second processor 190 controls the switching unit 150 to performing switching for data communication between the Bluetooth communication unit 140 and the second processor 190.

The switching unit 150 controls the internal switching of the Bluetooth communication unit 140, but this configuration causes no change in the object or method of the present disclosure and does not restrict the present disclosure.

The sensing unit 160 connects to the second processor 190, detects the change in location information of the mobile terminal 100 or surrounding environment, and sends the sensed information to the second processor 190. Particularly when the sensing unit 160 is connected to the second processor 190 in the state that the first processor 180 is in the active mode, the second processor 190 forwards the sensed information received from the sensing unit to the first processor 180.

The sensing unit 160 connects to the first and second processors 180 and 190. In this case, if the first processor 180 is in the active mode, the first processor 180 and the sensing unit 160 are connected directly in order for the first processor 180 to process the sensed information and, otherwise if the first processor 180 is in the sleep mode, the second processor 190 and the sensing unit 160 are connected directly in order for the second processor 190 to process the sensed information.

Particularly, the sensing unit 160 operates at a low energy or ultra-low energy level. The sensing unit 160 collects the information related to the location of the mobile terminal the sensing unit 160 includes at least one of a tri-axial geomagnetic sensor, for sensing the advancing direction of the mobile terminal, a gyro sensor for compensating the azimuth by sensing the change in angle, a tri-axial acceleration sensor for sensing movement speed and distance, a barometer for measuring atmospheric pressure altitude, an RGB sensor for sensing light, IR sensor for sensing a gesture, and a proximity sensor. The sensing unit 160 operates under the control of the second processor 190. In the case that the sensing unit 160 connects to the first and second processors 180 and 190, if the first processor 180 is in the active mode, the sensing unit 160 operates under the control of the first processor 180 and, otherwise if the first processor 180 is in the sleep mode, the sensing unit operates under the control of the second processor 190.

The sensing unit 160 can operate in an interrupt-driven method or a polling driven method. The interrupt-driven method is to collect data in response to the fulfillment of a predetermined condition, and the polling-driven method is to collect data at a predetermined period.

The storage unit 170 is configured to store various data executed and processed in the mobile terminal as well as the Operating System (OS) of the mobile terminal and various applications. The storage unit 170 is implemented with at least one of RAM, ROM, flash memory, volatile memory, EPROM, and EEPROM, but is not limited thereto.

The storage unit 170 includes a data region and a program region. The data region of the storage unit 170 stores the data generated in the mobile terminal and downloaded from outside the propriety information and the properties of the data. The data region stores the aforementioned screens displayed by the display unit 110. The data region stores the copied data to be pasted temporarily. The data region is also configured to store various setting values (e.g., screen brightness) for operation of the mobile terminal.

The program region of the storage unit 170 stores the Operating System (OS) for booting the mobile terminal under the control of the first processor 180 and application programs required for telephony function, video and audio playback function, picture display function, and camera shooting function. The program region is also configured to store application programs required for broadcast playback function, audio recording function, calculator function, schedule organizer function, etc.

The storage region of the storage unit 170 includes an extra storage region (not shown) controlled by the second processor 190. The extra storage region controlled by the second processor 190 allows access thereto even when the first processor 180 is in the sleep mode. The extra storage region controlled by the second processor 190 can be included in the second processor 190, but is not limited thereto. The extra storage region can be synchronized with the storage unit 170 under the control of the second processor 190 when the first processor 180 is in the active mode.

The storage unit 170 includes a storage space for sharing data between the first and second processors 180 and 190, the storage space being negated when the first and second processors 180 and 190 communicate to each other directly, but is not limited thereto.

The first processor 180 is the main processor for controlling overall operations of the mobile terminal and signal flows among the internal components and processing data. The first processor 180 can be any of Central Processing Unit (CPU) or Application Processor (AP), but is not limited thereto. The first processor 180 controls the protocol stack and profile 182 for BLE communication and the protocol stack and profile 181 for BT communication to process the Bluetooth communication data. The first processor 180 is configured to receive and process the Bluetooth communication data from the Bluetooth communication unit 140 in the active mode. The first processor 180 is configured to process the BLE packet and BT packet in the active mode.

The first processor 180 detects an operation change event from the input unit 120 or the second processor 190. The operation change event can include a state transition event of the first processor 180 from the active mode to the sleep mode, a state transition event of the first processor 180 from the sleep mode to the active mode, and a state change event of the utilization of the first processor 180 in which the utilization is greater than a predetermined threshold (e.g., 90%) becomes equal to or less than the threshold or the utilization is equal to or less than the predetermined threshold becomes greater than the threshold value. For example, if a user input for selecting a predetermined button (e.g., power key) is received, the first processor 180 in the active mode detects the state transition event in which the state of the first processor 180 transitions to the active mode or the sleep mode. The first processor in the sleep mode receives the user input corresponding to the power key from the second processor 190 to detect the state transition event.

If the operation state transition event is detected, the first processor 180 sends the changed operation state information to the second processor 190 and the Bluetooth communication unit 140. The operation state transition information of the first processor 180 can be sent to the second processor 190 and the Bluetooth communication unit 140 by the first processor 180, however, the present disclosure is not limited thereto. The second processor 190 and the Bluetooth communication unit 140 monitor the first processor 180 periodically to check the operation state of the first processor 180.

The first processor 180 receives Bluetooth communication data through the switching unit 150. The first processor 180 operating in the active mode receives the Bluetooth communication data via the switching unit 150.

If the Bluetooth communication data is received, the first processor 180 determines whether the condition for processing the Bluetooth communication is fulfilled. The Bluetooth communication can be the BLE packet. For example, if its utilization is equal to or less than a predetermined threshold (e.g., 90), the first processor 180 is configured to process the BLE packet. If its utilization is greater than the threshold, the first processor 180 operates such that the second processor 190 processes the BLE packet. If the BLE packet is received in the state that the utilization of the first processor 180 is greater than the threshold, the first processor 180 generates an interrupt signal to the second processor 190 and forwards the BLE packet to the second processor 190. The utilization of the first processor 180 can change to exceed the threshold in the state that the first processor 180 is processing the BLE packet. In this case, the first processor 180 generates an interrupt to the second processor 190 and forwards the BLE packet to the second processor 190.

The first processor 180 receives an interrupt from the second processor 190. The interrupt is the signal instructing to transition from the sleep mode to the active mode or to stop processing data in the active mode and start processing Bluetooth communication data first. In detail, the first processor 180 in the sleep mode wakes up upon receipt of the interrupt signal from the second processor 190. After waking up in response to the interrupt signal from the second processor, the first processor 180 enters the active mode to process the BLE packet received from the second processor. The first processor 180 receives the interrupt signal instructing the first processor 180 to process the BLE packet from the second processor 190 with priority. If the interrupt signal instructing to process the BLE packet with priority is received, the first processor 180 stops processing the current data and starts processing the BLE packet.

The second processor 190 includes the Micro Processor Unit (MPU), Micro Control Unit (MCU), sensor nub processor, etc. as low energy processors. The second processor 190 connects to the sensing unit 160 and the Bluetooth communication unit 140 to monitor occurrence of operation signals by detecting Bluetooth communication signal and sensor signal periodically. The second processor 190 includes the protocol stack and profile 191 for BLE communication.

The second processor 190 receives the information on the operation state of the first processor 180 or monitors it periodically. The second processor 190 controls the switching unit 150 to deliver the Bluetooth communication data to one of the first and second processors 180 and 190 selectively based on the received state information. The second processor 190 receives the operation state information from the first processor 180 or monitors the operation state of the first processor 180 periodically.

The second processor 190 receives the BLE packet which the first processor 180 has received from the Bluetooth communication unit 14 and forwarded to the second processor 190. If the BLE packet is received, the second processor 190 analyzes the header information included in the packet data and determines the data processing host. If the first processor 180 is determined as the data processing host, the second processor 190 generates an interrupt signal to wake up the first processor 180 and forwards the BLE packet to the first processor 180. If the second processor is determined as the data processing host, the second processor 190 is configured to process the BLE packet.

If the wake-up signal is received from the first processor 180 in the middle of processing the BLE packet, the second processor 190 forwards the BLE packet to the first processor 180. In the case that the first processor is operating in the active mode, the second processor 190 generates an interrupt signal instructing to stop processing the current task and start processing the BLE packet with priority. For example, if a BLE packet transmitted by a health care appliance or a medical appliance is received, the second processor 190 generates an interrupt; however the present disclosure is not limited thereto.

If the interrupt signal is received from the first processor 180, the second processor 190 receives the BLE packet transmitted by the first processor 180 and processes the BLE packet. For example, if the utilization of the first processor 180 in the active mode is greater than the threshold, the second processor 190 is configured to receiving BLE packet from the first processor 180 and processes the BLE packet.

When the first processor 180 is in the active mode, the second processor 190 operates in the sensor mode for processing the sensing information provided by the sensing unit 160; and when the first processor 180 is in the sleep mode, the second processor 190 operates in the Bluetooth communication mode for processing the Bluetooth communication data as well as in the sensor mode.

The second processor 190 calculates the location of the mobile terminal based on the information collected by the sensing unit 160 and the BLE packet received by the Bluetooth communication unit 140. The second processor 190 updates the coordinates of the location of the mobile terminal based on the information provided by the sensing unit 160 and use the BLE packet received, when the first processor 180 is in the sleep mode, to compensate for the accumulated error occurring in the update procedure.

Figure 2:
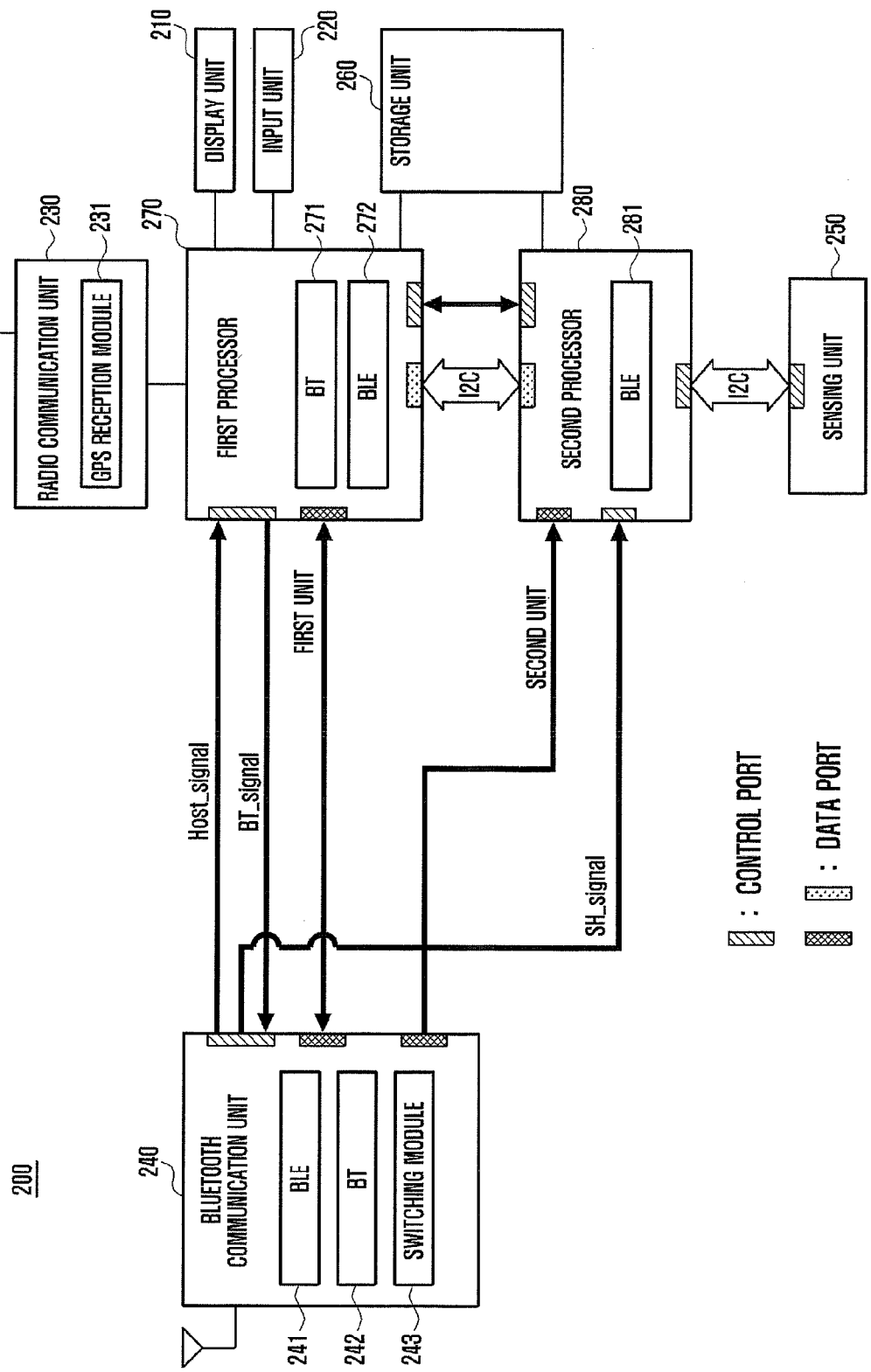
FIG. 2 is a block diagram illustrating the configuration of the mobile terminal according to embodiments of the present disclosure.

FIG. 2 is a block diagram illustrating the configuration of the mobile terminal 200 according to embodiments of the present disclosure.

Referring to FIG. 2, the mobile terminal 200, according to embodiments of the present disclosure, includes a display unit 210, an input unit 220, a radio communication unit 230, a Bluetooth communication unit 240, a sensing unit 250, a storage unit 260, a first processor (main processor) 270, and a second processor (sub-processor) 280.

Since the display unit 210, the input unit 220, the radio communication unit 230, and the sensing unit 250 are analogous to the display unit 110, the input unit 120, the radio communication unit 130, and the sensing unit 160 of the first embodiment, detailed descriptions thereof are omitted.

According to the second embodiment, the Bluetooth communication unit 240 connects to the first and second processors 270 and 280. In this case, the Bluetooth communication unit 240 and the first processor 270 are connected through a first data port supporting high speed data transfer, and the Bluetooth communication unit 240 and the second processor 280 are connected through a second data port supporting low speed data transfer. The first and second data ports can be implemented as serial ports such as UART port, but is not limited thereto. For example, the first data port between the Bluetooth communication unit 240 and the first processor 270 can be a serial port supporting a data rate of 4 Mbps, but is not limited thereto. Likewise, The Bluetooth communication unit 240 and the second processor can be connected through the serial port supporting data rate of 1 Mbps, but is not limited thereto.

The Bluetooth communication unit 240 includes at least one of a BLE communication module 242, a BT communication module, a Wi-Fi module (not shown), and a switching module 243. The BLE communication module 241 transmits/receives the BLE packet data, and the BT communication module 242 transmits/receives BT packet data without exception of BLE packet.

If the BT packet is received through the BT communication module, the Bluetooth communication unit 240 communicates with the first processor 270 through the first data port. The Bluetooth communication unit 240 transmits the BLE packet received via the BLE communication module to the second processor through the second data port.

The Bluetooth communication unit 240 is configured to receive the operation state information on the first processor from the first processor 270 or monitoring the operation state of the first processor 270 to check the operation state of the first processor 270.

If the BT packet or BLE packet is received in the state that the first processor 270 is in the active mode, the Bluetooth communication unit 240 is configured to transmit the BT packet or the BLE packet to the first processor 270 through the first data port. If the BLE packet is received in the state that the first processor 270 is in the sleep mode, the Bluetooth communication unit 240 is configured to exchange the BLE packet to the second processor 280 through the second data port.

The switching module 243 is configured to select the data port for delivering the Bluetooth communication data depending on the operation state of the first processor 270. For example, when the first processor 270 is in the active mode, the switching module 243 switches the data path to the first data port to communicate the Bluetooth communication data between the first processor 270 and the Bluetooth communication unit 240. When the first processor 270 operates in the sleep mode, the switching module 243 switches the data path to the second data port to communicate Bluetooth communication data between the second processor 280 and the Bluetooth communication unit 240.

Since the first and second processors 270 and 280 are analogous to the first and second processors 180 and 190 of the first embodiment, detailed descriptions thereof are omitted.

Figure 3:
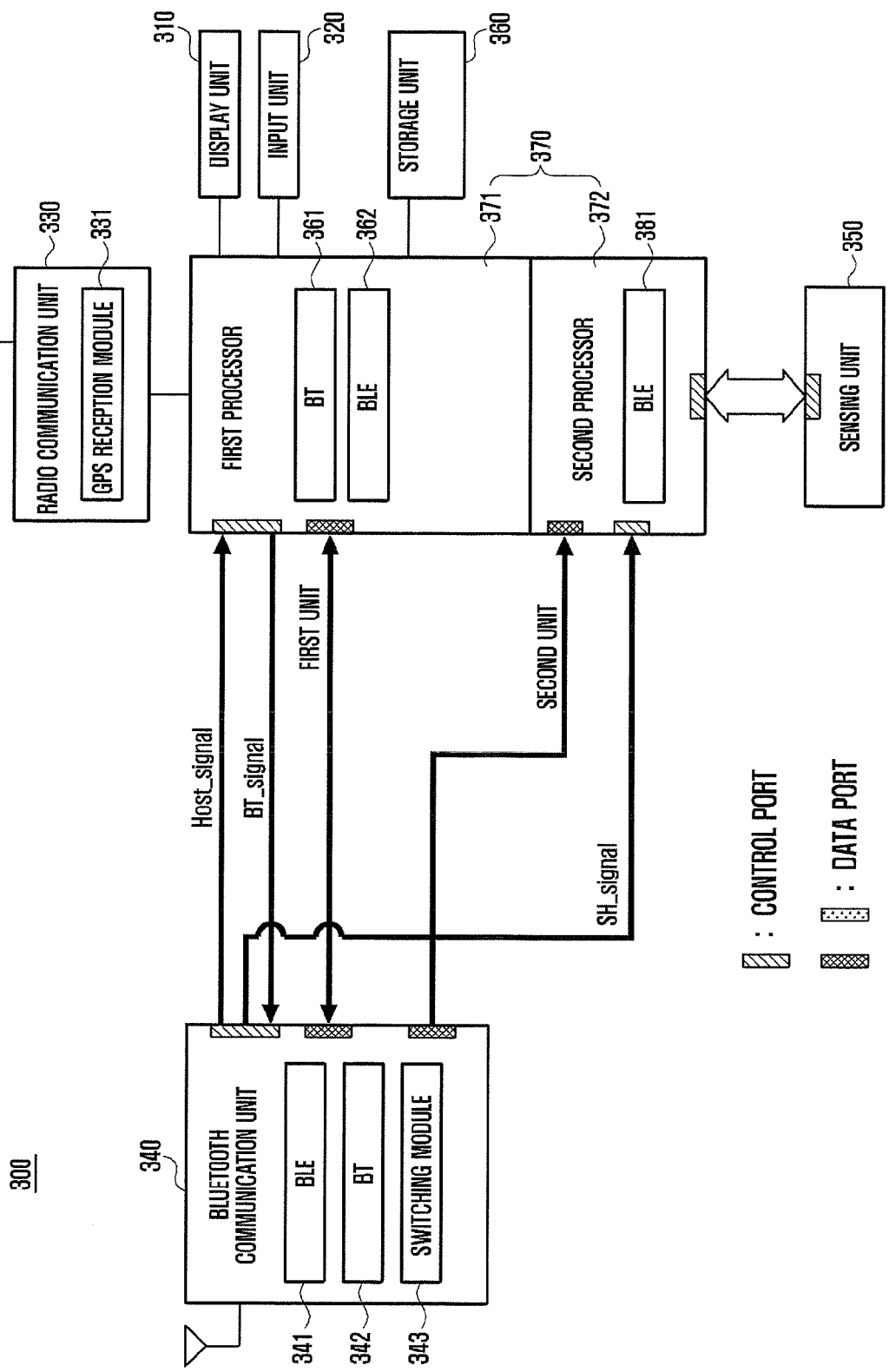
FIG. 3 is a block diagram illustrating the configuration of the mobile terminal according to embodiments of the present disclosure.

FIG. 3 is a block diagram illustrating the configuration of the mobile terminal 300 according embodiments of the present disclosure.

Referring to FIG. 3, the mobile terminal 300, according to embodiments of the present disclosure, includes a display unit 310, an input unit 320, a radio communication unit 330, a Bluetooth communication unit 340, a sensing unit 350, a storage unit 360, and a processor 370.

The processor 370 includes a first processor 371 and a second processor 372. The display unit 310, the input unit 320, the radio communication unit 330, the sensing unit 350, and the Bluetooth communication unit 340 are analogous to the display unit 210, the input unit 220, the radio communication unit 230, the sensing unit 250, and the Bluetooth communication unit 240 of the second embodiment, so that detailed descriptions thereof are omitted.

The processor 370 can be implemented as a system on chip integrating the first and second processors 371 and 372. The mobile terminal 300 has a storage space or sharing space for communication between the first and second processors 371 and 372, but is not limited thereto.

As shown in the second embodiment, the Bluetooth communication unit 340 connects to the first processor 371 through the first data port supporting high speed data transfer and to the second processor 372 through the second data port supporting low speed data transfer. The first and second data ports can be implemented as the serial ports such as MART port, but is not limited thereto. For example, the first data port between the Bluetooth communication unit 340 and the first processor 371 can be a serial port supporting a data rate of 4 Mbps, but is not limited thereto. The second data port between the Bluetooth communication unit 340 and the second processor 372 can be the serial port supporting a data rate of 1 Mbps, but is not limited thereto.

Since the first and second processors 371 and 372 and the Bluetooth communication unit 340 are analogous to the first and second processors 270 and 280 and the Bluetooth communication unit 240 of the second embodiment, detailed descriptions thereof are omitted.

Although not enumerated herein, the mobile terminal 300, according to embodiments of the present disclosure, is configured to include other components such as camera module in addition to the aforementioned components selectively according to the tendency of digital device convergence. The mobile terminal 300, according to embodiments of the present disclosure, can be implemented with or without any of the aforementioned components depending on its implementation.

Figure 4:
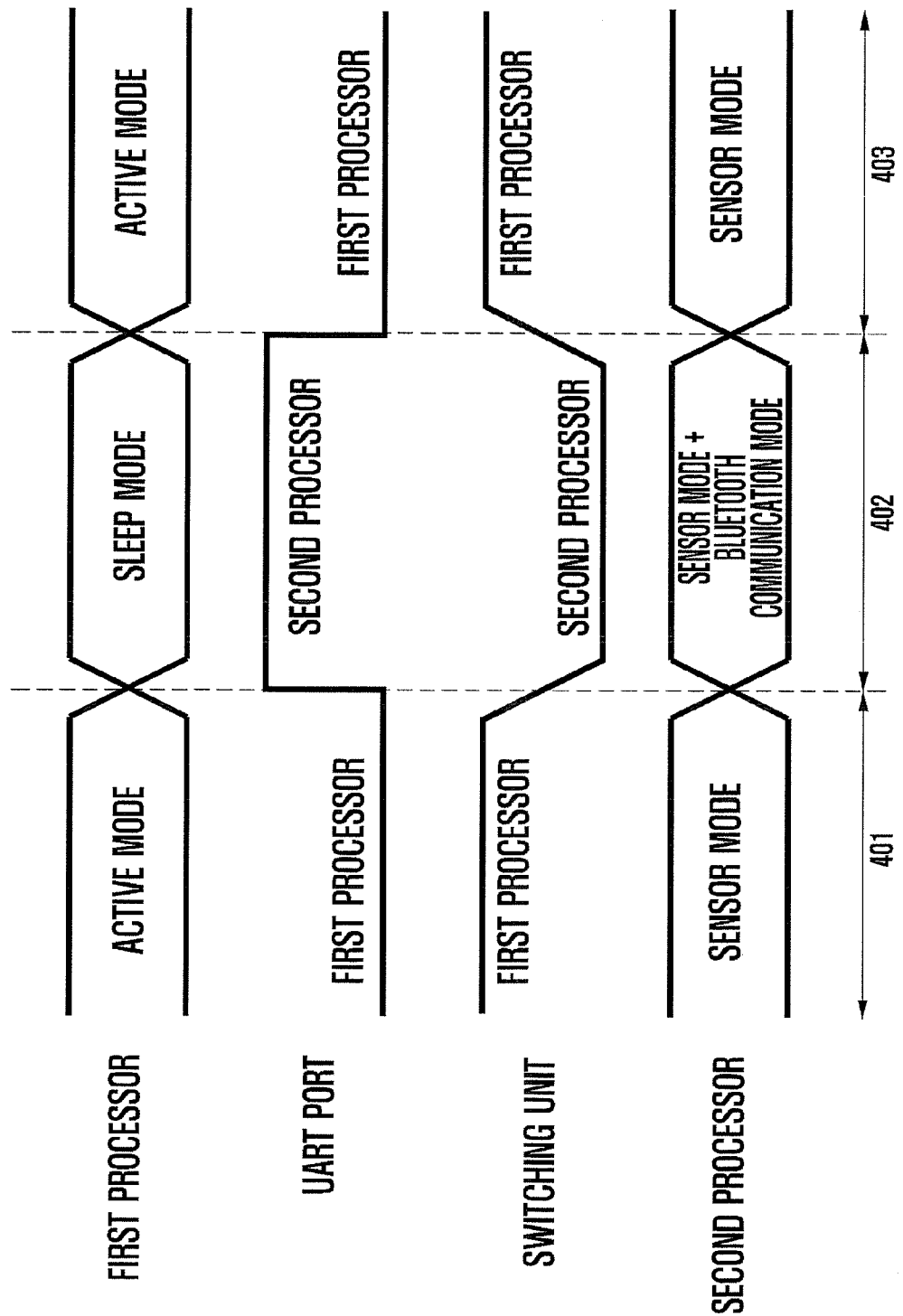
FIG. 4 is a timing diagram illustrating the operation state transitions of the components of the mobile terminal for processing the Bluetooth communication data according to embodiments of the present disclosure.

FIG. 4 is a timing diagram illustrating the operation state transitions of the components of the mobile terminal for processing the Bluetooth communication data according to embodiments of the present disclosure.

Referring to FIG. 4, the operation state of the first processor can transition from the active mode to the sleep mode and the sleep mode to the active mode. In the state that the first processor operates in the active mode for the durations 401 and 403, the data port (e.g., UART port) is activated for data communication between the first processor and the Bluetooth communication unit under the control of the first processor. At this time, the switching unit operates to establish a connection between the first processor and the Bluetooth communication unit. The second processor controls the sensing unit to operate only in the sensor mode for collecting the surrounding state information, environment information, and location information.

In the state that the first processor operates in the sleep mode for the duration 402, the data port releases the connection to the first processor and establishes the connection between the second processor and the Bluetooth communication unit for data communication. At this time, the switching unit operates to establish connection between the second processor and the Bluetooth communication unit. The second processor operates in the sensor mode and Bluetooth communication mode and is configured to control the Bluetooth communication unit as well as the sensing unit. The second processor operates in the Bluetooth communication mode for processing the Bluetooth communication (e.g., BLE packet) function as well as the sensor mode for collecting the sensing information.

Figure 5:
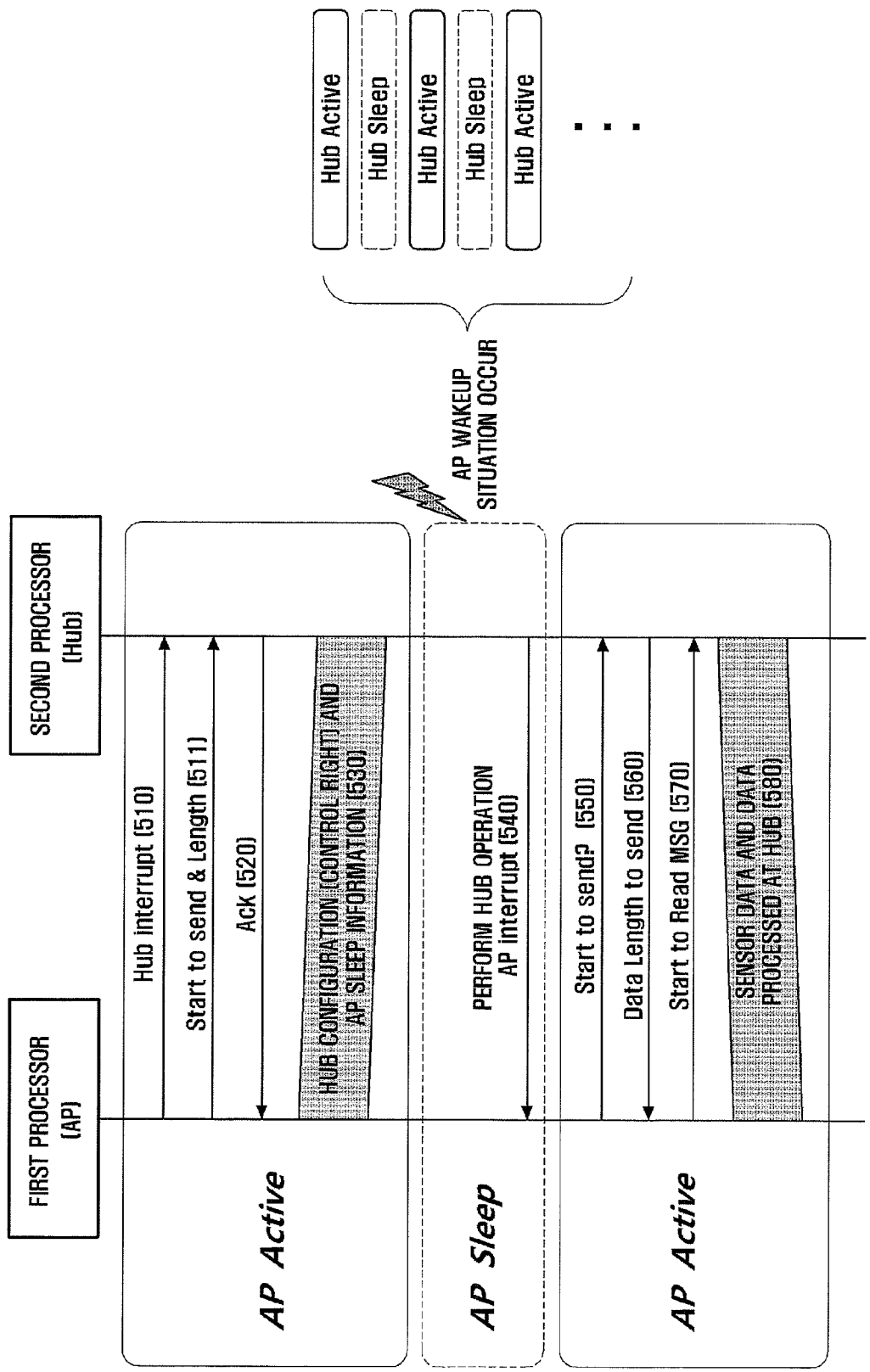
FIG. 5 is a signal flow diagram illustrating signal flows between the first and second processors of the terminal according to embodiments of the present disclosure.

FIG. 5 is a signal flow diagram illustrating signal flows between the first and second processors of the terminal according to embodiments of the present disclosure.

Referring to FIG. 5, the first and second processors exchange data through a synchronization protocol. For example, the first and second processors can use a serial communication protocol such as I2C communication protocol but are not limited thereto.

The first and second processors communicate through the communication protocol as follows. The table 3 shows a frame format of the messages for exchanging data between the first and second processors. The message frame format of table 3 is just an example, and the present disclosure is not limited thereto.

TABLE 3

| 0 | 8 | 16 | 24 | 32 |
|---|---|---|---|---|
| Command | Sensor Num. | Data Type | Data Size | |
| Data | | | | |

| 0 | 8 | 16 | 24 | 32 |
|---|---|---|---|---|
| Status | | | | |

The message frame of the communication protocol includes a command field including operation information transmitted from the first processor to the second processor, a sensor information field including specific sensor information, a data type field including content of the delivered operand, a data size field including the size of the real data to be transmitted next, and a status field including the state information of the first or second processor. The data length of each field is counted in bytes, but is not limited thereto.

The first processor operating in accordance with the communication protocol sends the operation state information (e.g., interrupt signal) to the second processor upon detection of a state transition event from the active mode to the sleep mode at step 510 and the transmission condition information and data information (start to send and length) at step 511. Then the second processor sends the first processor the response signal (ACKnowledge) correspond to the condition state information and data information at step 520.

If the acknowledge is received from the second processor, the first processor sends the second processor the control right information and sleep mode transition information at step 530. At this time, the control right of the second processor can include the right information configured to control the Bluetooth communication unit. Then the second processor receives the control right information and sleep mode transition information based on the transmission condition information.

Once the control right information and sleep mode transition information have been transmitted to the second processor completely, the first processor enters the sleep mode. If the first processor enters the sleep mode, the second processor operates in the Bluetooth communication mode and sensor mode to perform corresponding operations. At this time, the second processor can wake up the first processor. For example, if the processing host of the BLE packet received by the Bluetooth communication unit is the first processor or if the second processor has to alert the user of the mismatch between a specific field value parsed from the received BLE packet with the filtering condition, it is necessary to wake up the first processor.

The second processor generates an interrupt for waking up the first processor to the first processor at step 540. Then the first processor wakes up from the sleep mode to enter the active mode. The first processor sends the second processor the data transmission start condition information at step 550. Then the second processor sends the first processor the length information on the data to be transmitted to the first processor at step 560, and the first processor sends the second processor the data-read start information at step 570. Then the second processor sends the first processor the Bluetooth communication data or sensor data, which has been processed when the first processor is in the sleep mode, at step 580. Once the Bluetooth communication data or the sensor data transmitted by the second processor has been received completely, the first processor processes the received data.

Figure 6:
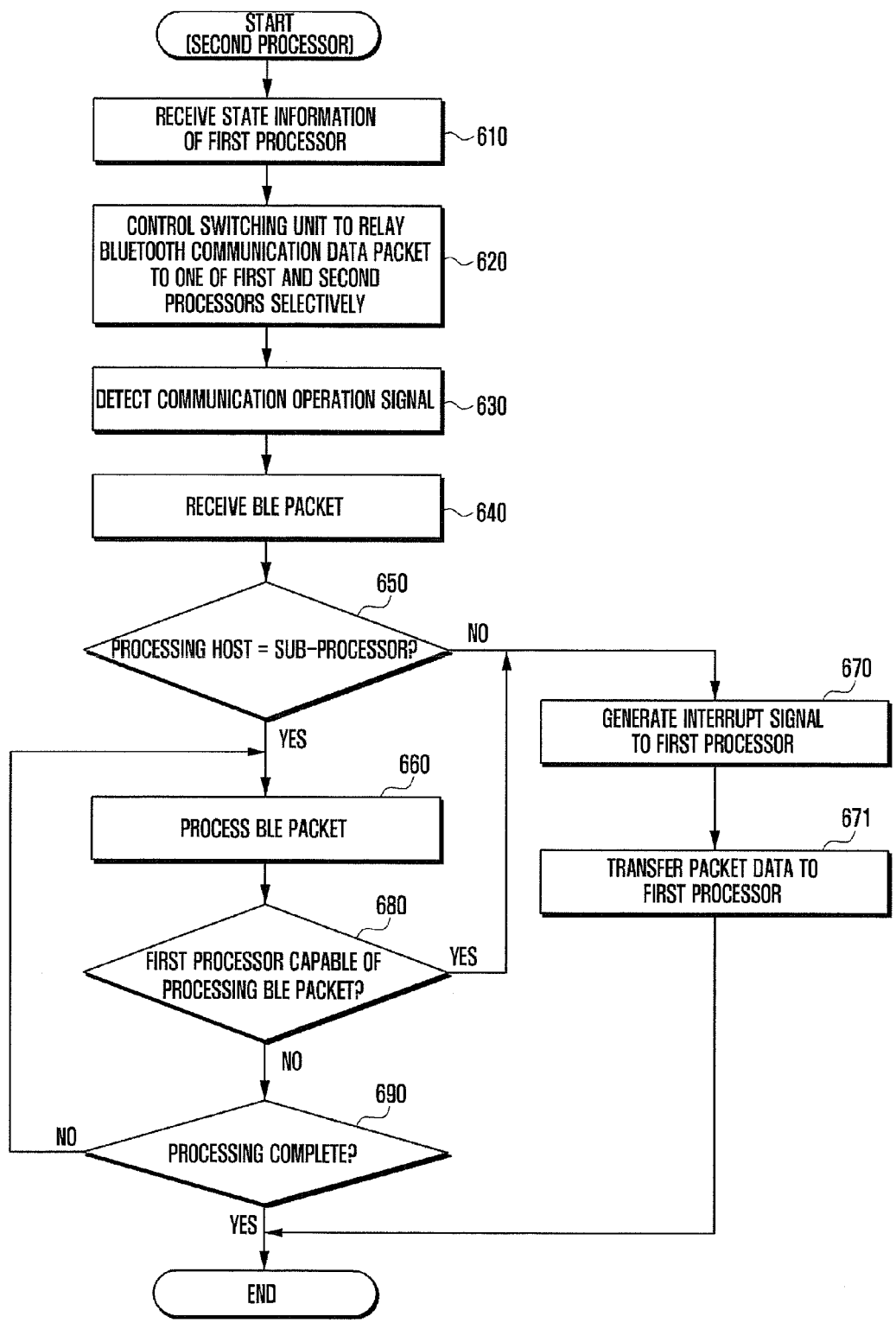
FIGS. 6 and 7 are flowcharts illustrating the BLE communication method according to embodiments of the present disclosure.
Figure 7:
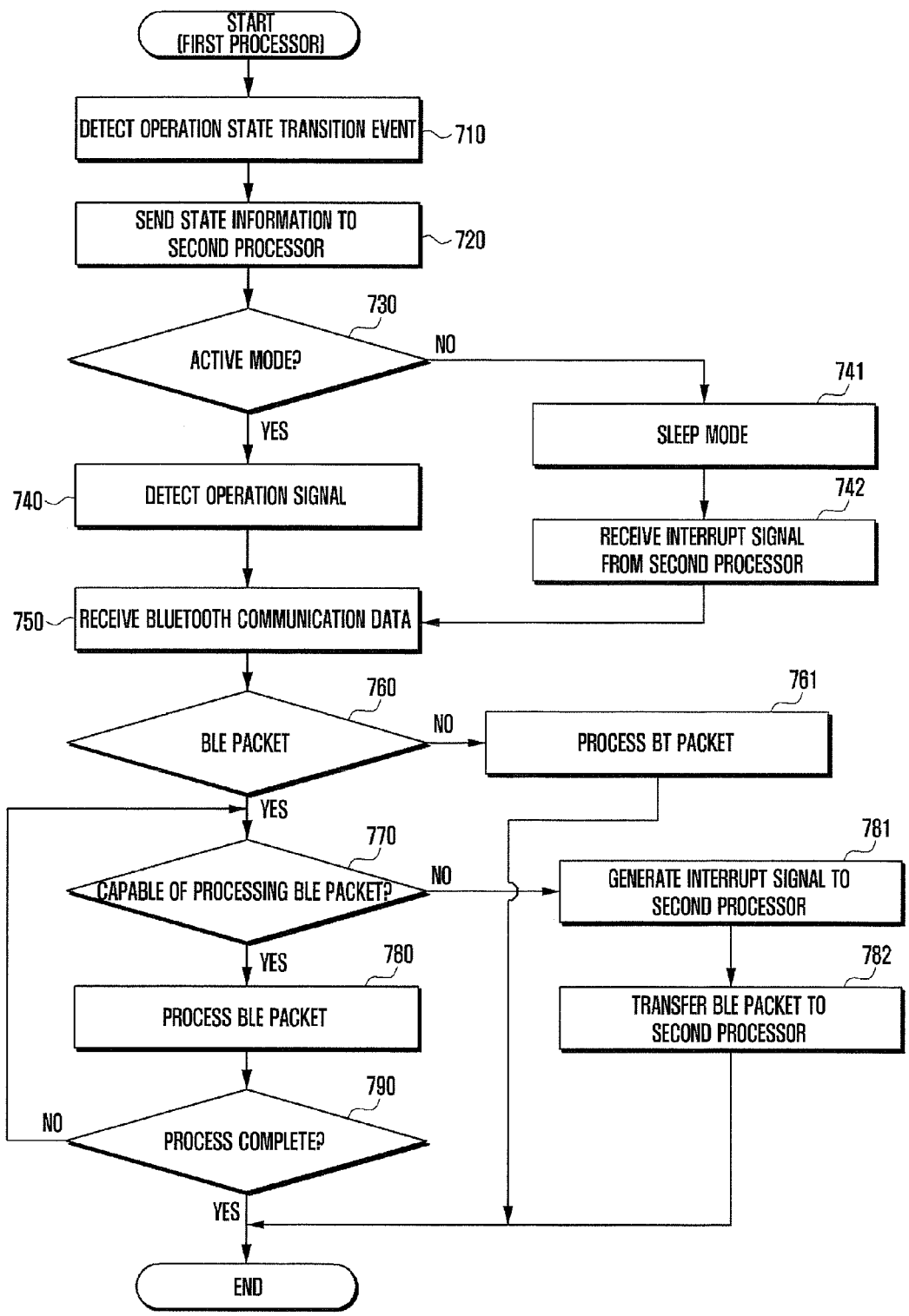

FIGS. 6 and 7 are flowcharts illustrating the BLE communication method according to embodiments of the present disclosure. FIG. 6 is the flowchart illustrating the operation procedure of a second processor of a mobile terminal of the present disclosure, and FIG. 7 is the flowchart illustrating the operation procedure of a first processor of a mobile terminal of the present disclosure.

Referring to FIG. 6, the second processor receives the operation state information on the first processor at step 610. The second processor receives at least one of the first processor's sleep mode operation state information, the first processor's active mode operation state information, the first processor's utilization state indicating utilization greater than the threshold, and the first processor's utilization state indicating utilization equal to or less than the threshold. The second processor is configured to monitor the first processor periodically to check the operation state of the first processor.

The second processor controls the switching unit to transfer the Bluetooth communication data to the first or second processor according to the operation state information on the first processor at step 620. In detail, if the first processor operates in the sleep mode or the utilization of the first processor is greater than the predetermined threshold value, the second processor controls the switching unit to relay the Bluetooth communication data to the second processor. If the first processor operates in the active mode or if the utilization of the first processor is equal to or less than the predetermined threshold value, the second processor controls the switching unit to relay the Bluetooth communication data to the first processor. If the first processor operates in the active mode, the second processor operates in the sensor mode for processing the sensor information and, otherwise if the first processor operates in the sleep mode, the second processors operates in the Bluetooth communication mode for processing the Bluetooth communication data as well as in the sensor mode.

The second processor detects the operation signal notifying of the existence of the Bluetooth communication data at step 630. The operation signal can be the operation signal received from the Bluetooth communication unit or an interrupt signal generated by the first processor. For example, when the first processor operates in the sleep mode, the second processor receives the operation signal notifying of the receipt of the BLE packet from the Bluetooth communication unit. When the first processor operates in the active mode, the second processor receives the interrupt notifying of the transfer of the packet to the second processor due to the first processor utilization greater than the threshold value.

The second processor receives the BLE packet at step 640. The second processor receives the BLE packet via the switching unit or forms the first processor directly. In the case that the second processor is implemented in the form of system on chip with the first processor, the Bluetooth communication data can be extracted from the shared storage space.

The second processor determines whether the data processing host is the second processor at step 650. For example, if the BLE packet is received, the second processor checks the header information added by the Bluetooth communication unit to determine whether the BLE packet processing host is the second processor or the first processor. The host for processing the BLE packet received from the first processor can be determined as the second processor.

If the BLE packet processing host is determined as the second processor at step 650, the second processor parses and processes the received BLE packet at step 660. If the BLE packet processing host is determined as the first processor at step 650, the second processor generates an interrupt signal to the first processor at step 670. The interrupt signal can be the interrupt signal for waking up the first processor to enter the active mode. The second processor transfers the received BLE packet to the first process operating in the active mode at step 671.

In the middle of processing the BLE packet, the second processor determines whether the first processor is configured to process the BLE packet at step 680. For example, if the operation state information indicating the first processor's operation state transition from the sleep mode to the active mode or the first processor's utilization change from the state greater than the threshold to the state equal to or less than the threshold, the second processor determines that the first processor is configured to process the BLE packet. If the first processor is configured to process the BLE packet, the second processor generates an interrupt signal informing of the existence of the data to be transferred to the first processor at step 670 and transfers the BLE packet to the first processor at step 671. If the first processor is incapable of processing the BLE packet at step 680, the second processor determines whether the BLE packet processing has completed at step 690 and continues operation until the BLE packet is processed completely.

The second processor operates as follows.

Referring to FIG. 7, the first processor detects a state transition event as a consequence of the operation state transition at step 710. The operation state transition event includes at least one of the event occurring when the operation state transition of the first processor transitions from the active mode to the sleep mode and the event occurring when the utilization of the first processor changes from the state greater than a predetermined threshold (e.g., 90%) to the state equal to or less than the threshold, but is not limited thereto.

If the operation state transition event is detected, the first processor sends the operation state information to the second processor and the Bluetooth communication unit at step 720. The first processor operates in the active mode or the sleep mode depending on the operation state information. In the active mode, the first processor operates in the state that its utilization is greater than a predetermined threshold or equal to or less than the threshold.

If it operates in the active mode at step 730, the first processor detects the operation signal at step 740. The operation signal is a wakeup signal notifying that Bluetooth communication data is received from the Bluetooth communication unit or an interrupt signal notifying that there is the BLE packet data to be transmitted by the second processor. In detail, the first processor in the active mode is configured to process the Bluetooth communication data, e.g., BT packet and BLE packet, in communication with the Bluetooth communication unit. The first processor in the active mode is also configured to process the BLE packet received from the second processor. If it is determined that the first processor is in the sleep mode at step 741, the first processor receives the interrupt signal generated by the second processor at step 742. The interrupt signal is the signal generated by the second processor for waking up the first processor.

The first processor receives the Bluetooth communication data from the Bluetooth communication unit or the second processor at step 750. The first processor determines whether the Bluetooth communication data is a BLE packet or a BT packet at step 760. If the Bluetooth communication data is the BT packet, the first processor processes the BT packet at step 761.

If the Bluetooth communication data is the BLE packet, the first processor determines whether the first processor is in the state capable of processing the BLE packet at step 770. For example, the first processor can determine whether a BLE packet processing availability condition is fulfilled. The BLE packet processing availability condition is fulfilled when the utilization of the first processor is equal to or less than a predetermined threshold value (e.g., 90%).

If the first processor is in the state capable of processing the BLE packet, the first processor processes the received BLE packet at step 780. Otherwise if the first processor is in the state incapable of processing the BLE packet, the first processor, i.e., if the utilization of the first processor is greater than the threshold value, the first processor generates an interrupt signal to the second processor at step 781 and transfers the BLE packet to the second processor at step 782.

The first processor determines whether the BLE packet has processed completely at step 790 and returns the procedure to step 770 to perform the above described steps until the BLE packet processing completes.

Figure 8:
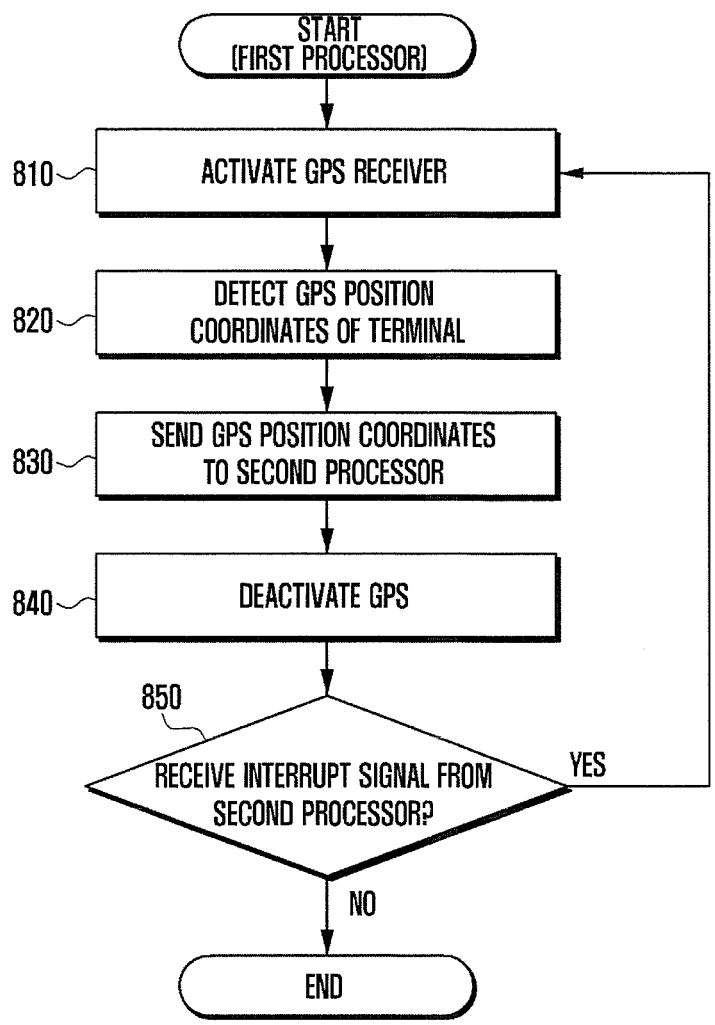
FIGS. 8 and 9 are flowcharts illustrating the location measurement procedure of the mobile terminal using BLE communication according to embodiments of the present disclosure.
Figure 9:
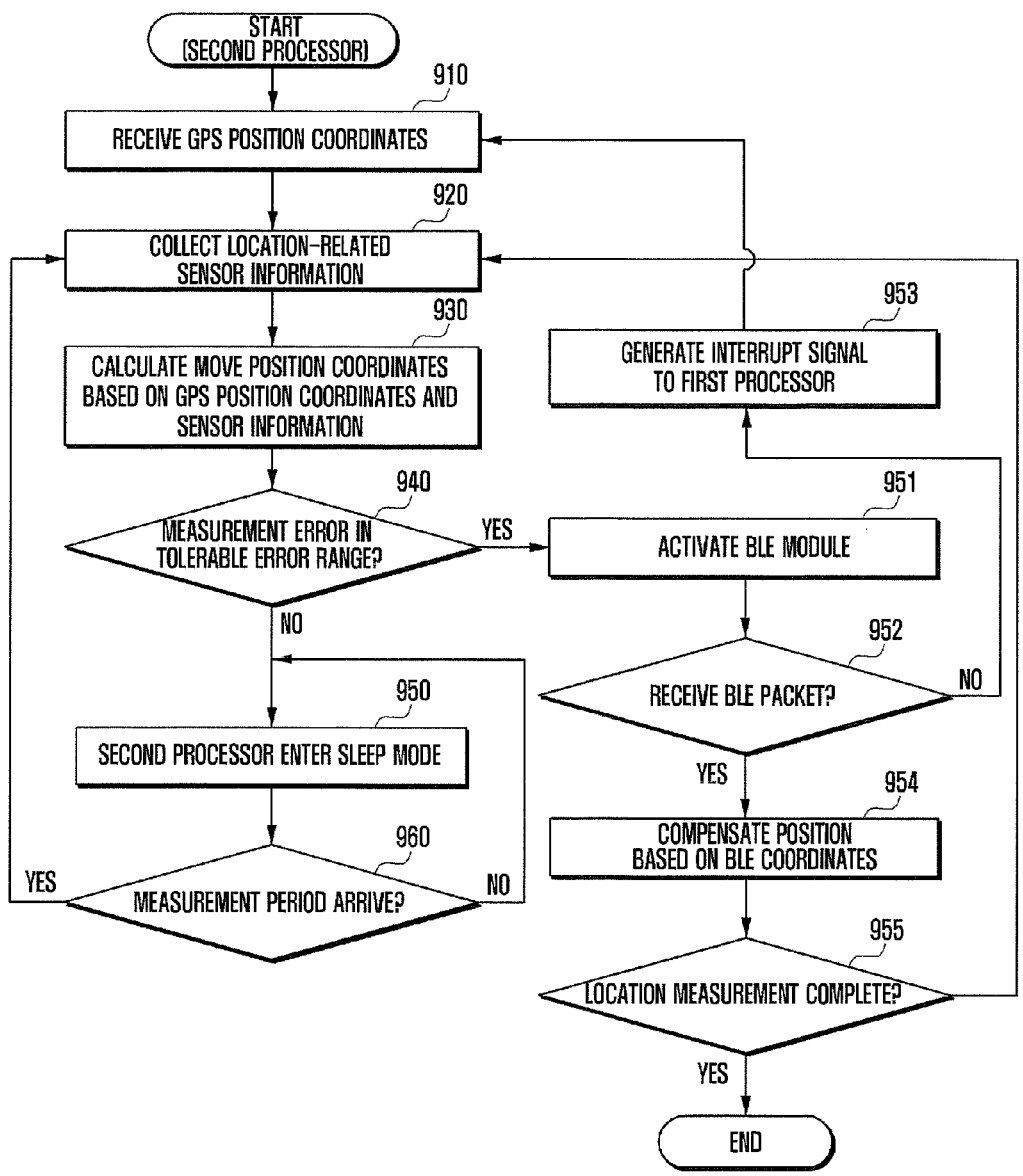

FIGS. 8 and 9 are flowcharts illustrating the location measurement procedure of the mobile terminal using BLE communication according to an embodiment of the present disclosure. FIG. 8 is the flowchart illustrating the operation procedure of the first processor, and FIG. 9 is the flowchart illustrating the operation procedure of the second processor.

Referring to FIG. 8, the first processor activates the GPS reception module first in order to measure the location of the mobile terminal at step 810. The mobile terminal has to operate in the active mode to activate the GPS reception module. The first processor receives the satellite GPS signal via the GPS receiver and calculates the GPS position coordinates of the mobile terminal based on the satellite GPS signal at step 820. The first processor sends the GPS position coordinates to the second processor at step 830. The first processor deactivates the GPS receiver at step 840. At this time, the first processor enters the sleep mode to deactivate the GPS receiver, however the present disclosure is not limited thereto. For example, the first processor operating in the active mode is configured to activate the GPS receiver when or only when the second processor requests for the GPS position information, to measure the GPS position coordinates and then deactivate the GPS receiver.

The first processor determines whether an operation signal requesting for the GPS position information is received from the second processor at step 850. The operation signal is the wakeup signal for waking up the first processor from the sleep mode. If the operation signal requesting for the GPS position information is received, the first processor returns the procedure to step 810 to repeat the above described steps.

A description is made of the operation procedure of the second processor for measuring the position of the mobile terminal hereinafter.

Referring to FIG. 9, the second processor receives the GPS position coordinates from the first processor at step 910. The second processor is configured to collect at least one sensor information from the sensing unit at step 920. The sensor information includes the information for use in position calculation such as movement speed and direction of the mobile terminal and atmospheric pressure. The second processor calculates the movement position coordinates of the terminal user with the collected sensor information based on the GPS position coordinates at step 930. For example, the second processor is configured to calculate the working speed of the mobile terminal user with the acceleration sensor information based on GPS position coordinates, the movement direction of the terminal user with the geomagnetic sensor information, the rotation speed with the gyro sensor information, and altitude and height (e.g., floor of a building) with the atmospheric sensor information. The second processor determines whether the measurement error is in a predetermined tolerable error range at step 940. If the measurement error is in the tolerable error range at step 940, the second processor operates in the sleep mode at step 950. The second processor in the sleep mode determines whether the position measurement period has arrived at step 960 and, if so, wakes up to return the procedure to step 920 to repeat the above described steps. Otherwise, if the position measurement period has not arrived yet, the second processor returns the procedure to step 950 to stay in the sleep mode.

If the measurement error of the moved position coordinates is out of the tolerable error range at step 940, the second processor activates the BLE communication mode at step 951. The second processor determines whether the BLE packet is received in the transfer distance via the BLE communication module at step 952. The BLE packet is the BLE packet broadcast by another Bluetooth communication device (e.g., BLE tag or BLE dongle), but is not limited thereto. The BLE packet includes the absolute position coordinates of the Bluetooth communication device which has broadcast the BLE packet.

The second processor determines whether a BLE packet is received at step 952. If the BLE packet is received at step 952, the second processor compensates the location information based on the position coordinates included in the BLE packet at step 954. For example, the first processor is configured to compensate for moved position coordinates so as to be in the tolerable measurement error range using the position coordinates included in the BLE packet. If no BLE packet is received, the second processor generates an interrupt signal to the first processor at step 953. The interrupt signal is the wakeup signal to request the first processor for the GPS position coordinates. Then the first processor activates the GPS receiver to receive the GPS position information, calculates the GPS position coordinates, and sends the GPS position coordinates to the second processor. The second processor returns the procedure to step 910 to perform the above described steps repeatedly. The second processor determines whether the position measurement has completed at step 955 and, if the position measurement has not completed, returns the procedure to step 920 to perform step 920 and the subsequent steps. As described above, when the first processor is in the sleep mode, the second processor measures the position information of the mobile terminal.

Figure 10:
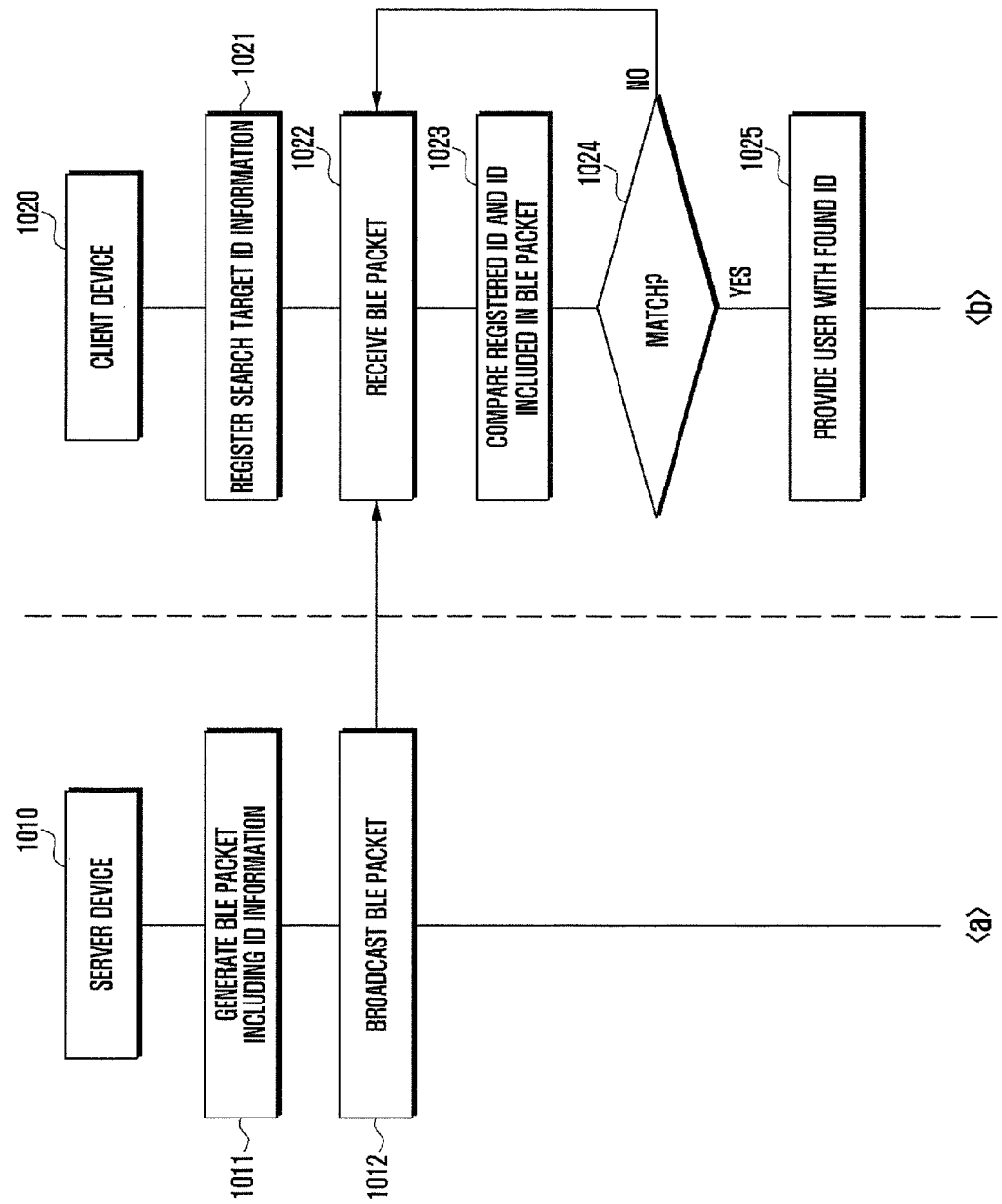
FIG. 10 is a flowchart illustrating the BLE communication function operation method according to embodiments of the present disclosure.

FIG. 10 is a flowchart illustrating the BLE communication function operation method according to embodiments of the present disclosure.

Referring to FIG. 10, the mobile terminal, according to embodiments of the present disclosure, supports a friend search function using the BLE communication function. The mobile terminal is configured to support the function of broadcasting the BLE packet including its device identifier (ID) such as phone number and contact name and the function of alarming, when a BLE packet is received from a registered friend's mobile terminal, the information on the receipt of the BLE packet.

For convenience sake, a description is made of the server device 1010 broadcasting the BLE packet and a client device 1020 scanning the BLE packet. The friend search function operates under the control of the second processor, but is not limited thereto.

The server device 1010 generates a BLE packet including its device ID under the control of the second processor at step 1011. The device ID includes the phone number of the service device and the device user name, but is not limited thereto. The server device 1010 broadcasts the BLE packet including its device identity information via the Bluetooth communication unit under the control of the second processor at step 1012.

The client device 1020 registers the device ID of the mobile terminal as a search target in search of a friend at step 1021. The client device 1020 is configured to receive the BLE packet broadcast within the Bluetooth communication distance (e.g., 50 m) under to control of the second processor at step 1022. At this time, if the first processor of the client device 1020 in the sleep mode, the BLE packet is transferred to the second processor, but is not limited thereto. The client device 1020 compares the registered ID with the ID included in the BLE packet under the control of the second processor at step 1023. The client device 1020 determines whether the registered ID and the ID included in the BLE packet match each other under the control of the second processor at step 1024. For example, if the BLE packet is received from the registered friend's mobile terminal, the second processor of the client device 1020 generates an interrupt signal to the first processor, and the first processor controls the display unit to present the friend search information to the first processor, e.g., at step 1025.

The mobile terminal can support the server device function and client device function simultaneously. The mobile terminal is configured to perform the friend search function with the BLE communication data under the control of the second processor although the mobile terminal, especially the first processor, operates in the sleep mode.

The mobile terminal of the present disclosure operates with one of different data processing hosts selectively depending on the operation state of the terminal, i.e., active mode and sleep mode, so as to monitor the low energy short range communication data (e.g., BLE communication and low energy Wi-Fi communication data) continuously and processes the data at the accurate period. The mobile terminal is configured to hand over the control, when the load of the first processor is significant, to the second processor such that the second processor processes the low energy short range communication data, resulting in fast and accurate process of short range communication data.

The mobile terminal is configured to calculate and compensate for the location of the mobile terminal with least energy consumption using the sensor data and BLE communication data, i.e., Bluetooth Low Energy (BLE) packet. Also, the mobile terminal is configured to perform the friend search function through exchange of terminal or personal identity information under the control of the second processor using the BLE communication data even when the mobile terminal, especially the first processor, operates in the sleep mode.

Although the Bluetooth communication function operation method and terminal supporting the same according to certain embodiments of the disclosure have been described using specific terms, the specification and drawings are to be regarded in an illustrative rather than a restrictive sense in order to help understand the present disclosure. Although the present disclosure has been described with certain embodiments, various changes and modifications may be suggested to one skilled in the art. It is intended that the present disclosure encompass such changes and modifications as fall within the scope of the appended claims.

What is claimed is:

1. A terminal including:
a BLUETOOTH communication unit;
a main processor configured to operate in one of a sleep mode and an active mode, wherein the main processor is configured to consume less energy in the sleep mode than in the active mode; and
a sub processor configured to:
determine, if a utilization of the main processor is greater than a predetermined threshold, which processor is to be a data processing host based on communication data received from the BLUETOOTH communication unit;
transfer, when the data processing host is the main processor, the communication data to the main processor; and
process, when the data processing host is the sub processor, the communication data.

2. The terminal of claim 1, wherein the sub processor is configured to transfer, when one of: the main processor in the sleep mode wakes up to the active mode, and the utilization of the main processor becomes equal to or less than the threshold, the communication data under processing to the main processor.

3. The terminal of claim 1, further comprising a switching unit configured to:
receive the communication data from the BLUETOOTH communication unit; and
relay the communication data to one of the main processor and the sub processor selectively.

4. The terminal of claim 3, wherein the main processor is configured to operate in one of the sleep mode and the active mode and process, in the active mode, the communication data received through the switching unit.

5. The terminal of claim 3, wherein the BLUETOOTH communication unit is connected to the switching unit and is configured to include a first data port configured to communicate BLUETOOTH communication data with the main processor and a second data port for communicating the BLUETOOTH communication data with the sub processor.

6. The terminal of claim 1, wherein the BLUETOOTH communication unit is configured to include, if operation information of the main processor is received from the main processor, a header information value indicating a data processing host in the communication data based on the operation information.

7. The terminal of claim 1, wherein the main processor is configured to:
detect one of an event transitioning between the active and sleep modes of the main processor and an event transitioning between a state where the utilization of the main processor is greater than the threshold and a state where the utilization of the main processor is equal to or less than the threshold; and
send, when the one of the events is detected, an operation information of the main processor to the sub processor and the BLUETOOTH communication unit.

8. The terminal of claim 1, wherein the main processor is configured to hand over, when the main processor transitions from the active mode to the sleep mode, a control right on the BLUETOOTH communication unit to the sub processor.

9. The terminal of claim 1, wherein the sub processor is configured to one of:
process the communication data received from one of the BLUETOOTH communication unit and the main processor if the main processor is the sleep mode;
receive operation information transmitted by the main processor; and
monitor an operation state of the main processor to acquire the operation information on the main processor.

10. The terminal of claim 1, wherein the sub processor is configured to:
analyze, when the communication data is received, a header information value of the communication data to determine a data processing host;
forward, when the data processing host is the main processor, the communication data to the main processor; and
process, when the data processing host is the sub processor, the communication data.

11. The terminal of claim 1, further comprising:
a sensing unit connected to the sub processor and configured to collect sensor information related to a location of the terminal at a level; and
a Global Positioning System (GPS) receiver connected to the main processor and configured to collect GPS location information,
wherein the main processor is configured to:
calculate GPS location coordinates based on a satellite GPS signal from the GPS receiver;
transfer the calculated GPS location coordinates to the sub processor; and
deactivate the GPS receiver until an interrupt signal is generated by the sub processor; and
wherein the sub processor is configured to:
receive the GPS location coordinates from the main processor;
collect the sensor information related to the location from the sensing unit; and
calculate moved location coordinates of the terminal based on the GPS location coordinates and the sensor information.

12. The terminal of claim 11, wherein the sub processor is configured to:
determine, when the moved location coordinates are in a tolerable error range, whether the communication data is received from the BLUETOOTH communication unit; and
compensate, when the communication data is received, the moved location coordinates to be in the tolerable error range based on the communication data.

13. A terminal comprising:
a BLUETOOTH communication unit;
a switching unit configured to:
receive communication data from the BLUETOOTH communication unit; and
output the communication data;
a main processor configured to receive the communication data received from the BLUETOOTH communication unit via the switching unit; and
a sub processor configured to:
receive the communication data received from the BLUETOOTH communication unit via the switching unit;
receive operation state information from the main processor, the operation state information including information regarding a sleep mode and an active mode of the main processor, wherein the main processor is configured to consume less energy in the sleep mode than in the active mode; and control, when the operation state information is received, the switching unit to relay the communication data to one of the main processor and the sub processor based on the operation state information.

14. The terminal of claim 13, wherein the BLUETOOTH communication unit and the sub processor are configured to one of:

receive the operation state information transmitted by the main processor; and monitor operation state of the main processor to acquire the operation state information.

15. The terminal of claim 13, wherein the BLUETOOTH communication unit is configured to add a header information value indicating a data processing host to the communication data based on the operation state information and sends the communication data to the switching unit.

16. The terminal of claim 13, wherein the main processor is configured to:

determine, when the communication data is received, whether a utilization of the main processor is equal to or less than a predetermined threshold;

process, when the utilization of the main processor is equal to or less than the threshold, the communication data; and transfer, when the utilization of the main processor is greater than the threshold, the communication data to the sub processor.

17. The terminal of claim 13, wherein the sub processor is configured to:

determine, when the communication data is received, a data processing host by analyzing a header information value of the communication data, transfer, when the data processing host is the main processor, the communication data to the main processor, and process, when the data processing host is the sub processor, the communication data.

18. A BLUETOOTH communication data processing method of a terminal, the method comprising:

receiving, at a sub processor, operation state information of a main processor from the main processor, the operation state information including information regarding a sleep mode and an active mode of the main processor, wherein the main processor consumes less energy in the sleep mode than in the active mode;

controlling, at the sub processor, a switching unit to relay communication data to one of the main processor and the sub processor based on the operation state information; and processing, at the sub processor when the communication data is received via the switching unit, the communication data.

19. The method of claim 18, wherein processing comprises:

determining a data processing host for processing the communication data;

generating, when the data processing host is the main processor, an interrupt signal for transitioning operation state of the main processor; and forwarding, when the operation state of the main processor is transitioned, the communication data to the main processor.

20. The method of claim 18, further comprising:

stopping, when one of the operation state of the main processor transitions from the sleep mode to the active mode, and when a utilization of the main processor changes from a state greater than a predetermined threshold to a state equal to or less than the threshold in the state that the sub processor is processing the communication data, processing the communication data; and transferring the communication data to the main processor.

* * * * *